US012781164B2

(12) United States Patent
Kato et al.

(10) Patent No.: US 12,781,164 B2
(45) Date of Patent: Nov. 3, 2026

(54) BEER-FLAVORED BEVERAGE

(71) Applicant: SUNTORY HOLDINGS LIMITED, Osaka (JP)

(72) Inventors: Yuichi Kato, Fuchu (JP); Yugo Hayakawa, Fuchu (JP); Hiroyuki Abe, Fuchu (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 233 days.

(21) Appl. No.: 18/718,933

(22) PCT Filed: Dec. 27, 2022

(86) PCT No.: PCT/JP2022/048401
§ 371 (c)(1),
(2) Date: Jun. 12, 2024

(87) PCT Pub. No.: WO2023/127921
PCT Pub. Date: Jul. 6, 2023

(65) Prior Publication Data

US 2024/0417657 A1 Dec. 19, 2024

(30) Foreign Application Priority Data

Dec. 27, 2021 (JP) ................................ 2021-213189

(51) Int. Cl.

| | |
|---|---|
| ***C12G 3/06*** | (2006.01) |
| ***A23L 2/54*** | (2006.01) |
| ***A23L 2/56*** | (2006.01) |
| ***C12C 7/01*** | (2006.01) |
| ***C12C 7/26*** | (2006.01) |
| ***C12C 11/00*** | (2006.01) |

(52) U.S. Cl.
CPC .................. *C12G 3/06* (2013.01); *A23L 2/54* (2013.01); *A23L 2/56* (2013.01); *C12C 7/01* (2013.01); *C12C 7/26* (2013.01); *C12C 11/003* (2013.01)

(58) Field of Classification Search
CPC ....... C12C 11/00; C12C 12/04; C12C 11/003; C12C 11/02; C12C 5/026; C12C 5/02; C12C 12/00; C12G 3/00; C12G 3/025; C12G 3/021; C12G 3/02; C12G 3/06; A23L 33/10; A23L 2/00; A23L 27/88; A23L 2/52; A23L 2/38; A23L 27/10
USPC ............................................... 426/16, 11, 13
See application file for complete search history.

(56) References Cited

U.S. PATENT DOCUMENTS

| | | | | | |
|---|---|---|---|---|---|
| 3,373,040 | A * | 3/1968 | Gluek | C12C 5/00 426/16 |
| 2007/0254063 | A1* | 11/2007 | Aerts | C12C 3/08 426/11 |
| 2020/0032180 | A1* | 1/2020 | Shinkai | C12C 7/00 |
| 2022/0220426 | A1 | 7/2022 | Kubota et al. | |

FOREIGN PATENT DOCUMENTS

| | | | |
|---|---|---|---|
| JP | 2014-000055 | A | 1/2014 |
| JP | 2014-064488 | A | 4/2014 |
| JP | 2015-123053 | A | 7/2015 |
| JP | 2020-195318 | A | 12/2020 |
| JP | 2021-013343 | A | 2/2021 |
| JP | 2021-097668 | A | 7/2021 |
| JP | 2021-114959 | A | 8/2021 |
| JP | 2021-192605 | A | 12/2021 |
| WO | 2021/256543 | A1 | 12/2021 |

OTHER PUBLICATIONS

Hasegawa et al. JP 2020195318 A, English Machine Translation, Dec. 10, 2020, pp. 1-9. (Year: 2020).*
Takahashi, JP 2014123052 A, English Machine Translation, Jul. 6, 2015, pp. 1-2. (Year: 2015).*
International Search Report dated Mar. 20, 2023, issued in counterpart Application No. PCT/JP2022/048401, with English translation. (6 pages).
Ueda, Ryuzo et al., Studies on the Organic Acids in Beers (I) Composition of Organic Asids in Commercial Beers, Journal of Fermentation Technology, vol. 41, No. 1, p. 10-14, 1963, with English Abstract. (6 pages); cited in ISR.
Yoshida, Juko, Chapter 1 General Ingredients of Beer, Journal of the Brewing Societ of Japan, vol. 71, No. 7, p. 505-510, 1976, with partial English machine translation. (10 pages); cited in ISR and JP Office Action dated Jul. 9, 2024.
Office Action dated Jul. 18, 2023, issued in counterpart JP Application No. 2023-534375, with English translation. (19 pages).
Decision to Grant dated Oct. 24, 2023, issued in counterpart JP Application No. 2023-534375 with English translation. (5 pages).
Chelack, B.J. and Ingledew, W.M. , Anaerobic Gram-Negative Bacteria in Brewing—A Review, ASBC Journal, vol. 45, No. 4, p. 123-127, 1987. (5 pages); cited in Third Party Submission dated Jun. 4, 2024 and JP Office Action dated Jul. 9, 2024.
Takoi, K. et al., "Systematic Analysis of Behaviour of Hop-Derived Monoterpene Alcohols During Fermentation and New Classification of Geraniol-Rich Flavour Hops", Brewing Science, vol. 70, p. 177-186, 2017. (10 pages) cited in Third Party Submission dated Jun. 4, 2024 and JP Office Action dated Jul. 9, 2024.
Third Party Submission dated Jun. 4, 2024, issued in counterpart JP Application No. 2023-197966. (10 pages).
Sachon, Verlag W., Brauindustrie, Brewing Industry, vol. 67, p. 76-79, 1982, with patial English translation. (4 pages) cited in Third Party Submission dated Jun. 4, 2024 and JP Office Action dated Jul. 9, 2024.

(Continued)

*Primary Examiner* — Hong T Yoo
(74) *Attorney, Agent, or Firm* — WHDA, LLP

(57) ABSTRACT

This beer-flavored beverage has a genuine extract value of at most 2.30 mass %, a pyroglutamic acid content of at least 15 mg/L, and a linalool content of 5-100 mass ppb.

23 Claims, No Drawings

(56) References Cited

OTHER PUBLICATIONS

Summary of Brauindustrie, p. 76-79, prepared by the Third Party with English translation. (3 pages); cited in Third Party Submission dated Jun. 4, 2024.

Sachon, Verlag W., Brauindustrie, Brewing Industry, vol. 67, p. 138-141, 1982, with partial English translation. (4 pages); cited in Third Party Submission dated Jun. 4, 2024 and JP Office Action dated Jul. 9, 2024.

Summary of Brauindustrie, p. 138-141, prepared by the Third Party, with English translation. (3 pages) cited in Third Party Submission dated Jun. 4, 2024.

Nutritionix [online] <URL: https://www.nutritionix.com/food/millerlitebeer> (4 pages); cited in JP Office Action dated Jul. 9, 2024.

Schonberger, C. et al., 125th Anniversary Review: The Role of Hops in Brewing, Journal of the Institute of Brewing, vol. 117, No. 3, p. 259-267, 2011 (9 pages).

* cited by examiner

BEER-FLAVORED BEVERAGE

TECHNICAL FIELD

The present invention relates to a beer-taste beverage.

BACKGROUND ART

Various beer-taste beverages have been studied and provided in response to recent diversified preferences of consumers.

For example, Patent Document 1 discloses a beer-taste fermented malt beverage with an alcohol concentration of less than 1% (v/v), containing a wort fermented liquid, more than 5.3 ppm and less than 80 ppm of pyruvic acid, and more than 29.2 ppm and less than 90 ppm of succinic acid, and having a real extract concentration of more than 2.0% (w/w).

CITATION LIST

Patent Document

Patent Document 1: JP 2021-114959 A

SUMMARY OF INVENTION

Technical Problem

For such a beer-taste fermented malt beverage, the "heavy" mouthfeel characteristic to the beer-taste beverage is often noticeable. A reduction in real extract value solves such a problem and ensures quaffability. However, a low real extract value involves a problem of difficulty in perceiving a full bodied taste typical of beer-taste beverages.

Therefore, there is a demand for a beer-taste beverage having a full bodied taste typical of beer-taste beverages while ensuring quaffability.

Solution to Problem

The present invention provides a beer-taste beverage having a real extract value, a pyroglutamic acid content, and a linalool content adjusted to predetermined ranges.

That is, the present invention includes the following embodiments.

[1]

A beer-taste beverage having:

a real extract value of 2.30 mass % or less;

a content of pyroglutamic acid of 15 mg/L or more; and a content of linalool of from 5 to 100 ppb by mass.

[2]

The beer-taste beverage according to [1], wherein the real extract value is 0.55 mass % or more.

[3]

The beer-taste beverage according to [1], wherein the real extract value is less than 1.50 mass %.

[4]

The beer-taste beverage according to any one of [1] to [3], wherein a content of dietary fiber is less than 0.5 g/100 mL.

[5]

The beer-taste beverage according to any one of [1] to [4], wherein a malt ratio is 50 mass % or more.

[6]

The beer-taste beverage according to any one of [1] to [5], wherein the malt ratio is 90 mass % or less.

[7]

The beer-taste beverage according to any one of [1] to [5], wherein the malt ratio is 90 mass % or more.

[8]

The beer-taste beverage according to any one of [1] to [5], wherein the malt ratio is less than 67 mass %.

[9]

The beer-taste beverage according to any one of [1] to [8], wherein a carbohydrate content is 2.0 g/100 mL or less.

[10]

The beer-taste beverage according to any one of [1] to [8], wherein the carbohydrate content is less than 1.0 g/100 mL.

[11]

The beer-taste beverage according to any one of [1] to [10], wherein a ratio [(X)/(Y)] of the content of pyroglutamic acid (X) (unit: mg/L) to the content of linalool (Y) (unit: ppb by mass) is from 0.5 to 32.

[12]

The beer-taste beverage according to any one of [1] to [10], wherein the ratio [(X)/(Y)] of the content of pyroglutamic acid (X) (unit: mg/L) to the content of linalool (Y) (unit: ppb by mass) is from 0.5 to 15.

[13]

The beer-taste beverage according to any one of [1] to [12], wherein a ratio [(X)/(Z)] of the content of pyroglutamic acid (X) (unit: mg/L) to the carbohydrate content (Z) (unit: g/100 mL) is from 30 to 450.

[14]

The beer-taste beverage according to any one of [1] to [12], wherein the ratio [(X)/(Z)] of the content of pyroglutamic acid (X) (unit: mg/L) to the carbohydrate content (Z) (unit: g/100 mL) is from 30 to 300.

[15]

The beer-taste beverage according to any one of [1] to [14], wherein a ratio [(Y)/(Z)] of the content of linalool (Y) (unit: ppb by mass) to the carbohydrate content (Z) (unit: g/100 mL) is from 5 to 200.

[16]

The beer-taste beverage according to any one of [1] to [15], wherein the beer-taste beverage is a top-fermented beer-taste beverage.

[17]

The beer-taste beverage according to any one of [1] to [15], wherein the beer-taste beverage is a bottom-fermented beer-taste beverage.

[18]

The beer-taste beverage according to any one of [1] to [17], wherein the beer-taste beverage is beer.

[19]

The beer-taste beverage according to any one of [1] to [18], wherein a total polyphenol amount is from 20 to 250 ppm by mass, and a total nitrogen amount is from 5 to 100 mg/100 mL.

[20]

A method for producing a beer-taste beverage including adjusting, in a final product:

a real extract value to 2.30 mass % or less;

a content of pyroglutamic acid to 15 mg/L or more; and a content of linalool to from 5 to 100 ppb by mass.

[21]

The production method according to [20], further including performing fermentation using a top-fermenting yeast.

[22]

The production method according to [20], including performing fermentation using a bottom-fermenting yeast.

Advantageous Effects of Invention

According to a preferred embodiment of the present invention, there is provided a beer-taste beverage having a suitable full bodied taste while ensuring quaffability by reducing a real extract value to a certain amount or less. Further, according to a preferred embodiment of the present invention, there is provided a beer-taste beverage having a refreshing aftertaste. In addition, according to a preferred embodiment of the present invention, there is provided a beer-taste beverage having a suppressed sweet aroma unsuitable for beer-taste beverages.

DESCRIPTION OF EMBODIMENTS

For numerical ranges described herein, upper and lower limits can be arbitrarily combined. For example, the numerical range of "preferably from 3.0 to 15, and more preferably from 3.2 to 13" described herein includes also a range of "from 3.0 to 13" and a range of "from 3.2 to 15". In addition, for example, the numerical range of "preferably 30 or more, and more preferably 40 or more, and preferably 100 or less, and more preferably 80 or less" described herein includes also a range of "from 30 to 80" and a range of "from 40 to 100".

In addition, for example, the numerical range of "from 60 to 100" described herein means a range of "60 or more (60 or more than 60) and 100 or less (100 or less than 100)".

Furthermore, in the definitions of the upper limit values and the lower limit values described herein, numerical ranges of from lower limit values to upper limit values can be defined by appropriately selecting numerical values from among respective options and arbitrarily combining them.

In addition, a plurality of various requirements described as preferred embodiments described herein can be combined.

1. Beer-Taste Beverage

The "beer-taste beverage" herein refers to an alcohol-containing carbonated beverage with a beer-like flavor. That is, unless otherwise specified, the beer-taste beverage herein includes any carbonated beverage having a beer flavor.

Therefore, the "beer-taste beverage" includes not only beers, which are malt-fermented beverages produced by fermenting malts, hops, and water as raw materials with yeasts, and fermented beer-taste beverages, but also carbonated beverages added with a beer flavoring including esters, higher alcohols, and lactones. The beer-taste beverage according to one embodiment of the present invention is beer.

Examples of the beer flavoring include isoamyl acetate, ethyl acetate, n-propanol, isobutanol, acetaldehyde, ethyl caproate, ethyl caprylate, isoamyl propionate, linalool, geraniol, citral, 4-vinylguaiacol (4-VG), 4-methyl-3-pentenoic acid, 2-methyl-2-pentenoic acid, 1,4-cineol, 1,8-cineol, 2,3-diethyl-5-methylpyrazine, γ-decanolactone, γ-undecalactone, ethyl hexanoate, ethyl 2-methylbutyrate, ethyl n-butyrate, myrcene, citral, limonene, maltol, ethyl maltol, phenylacetic acid, furaneol, furfural, methional, 3-methyl-2-butene-1-thiol, 3-methyl-2-butanethiol, diacetyl, ferulic acid, geranic acid, geranyl acetate, ethyl butyrate, octanoic acid, decanoic acid, 9-decenoic acid, nonanoic acid, tetradecanoic acid, propanoic acid, 2-methylpropanoic acid, γ-butyrolactone. 2-aminoacetophenone, ethyl 3-phenylpropionate, 2-ethyl-4-hydroxy-5-methyl-3 (2H)-furanone, dimethylsulfone, 3-methylcyclopentane-1,2-dione, 2-methylbutanal, 3-methylbutanal, 2-methyltetrahydrofuran-3-one, 2-acetylfuran, 2-methyltetrahydrofuran-3-one, hexanal, hexanol, cis-3-hexenal, 1-octen-3-ol, β-eudesmol, 4-mercapto-4-methylpentan-2-one. β-caryophyllene, β-myrcene, furfuryl alcohol, 2-ethylpyrazine, 2,3-dimethylpyrazine, 2-methylbutyl acetate, isoamyl alcohol, 5-hydroxymethylfurfural, phenylacetaldehyde, 1-phenyl-3-buten-1-one, trans-2-hexenal, nonanal, and phenethyl alcohol.

Furthermore, the beer-taste beverage according to one embodiment of the present invention may be an ale beer-taste beverage brewed through a fermentation step using a top-fermenting yeast (e.g., *Saccharomyces*), a lager beer-taste beverage brewed through a fermentation step using a bottom-fermenting yeast (e.g., *Saccharomyces*), a pilsner beer-taste beverage, or the like, or may be a beer-taste beverage produced by blending these beer-taste beverages. The term "fermentation" as used herein may be alcoholic fermentation in which an alcohol is produced or non-alcoholic fermentation in which no alcohol is produced.

An alcohol content (ethanol content) of the beer-taste beverage is not particularly limited, and may be preferably 0.5 (v/v) % or more, more preferably 1.0 (v/v) % or more, even more preferably 1.5 (v/v) % or more, still more preferably 2.0 (v/v) % or more, further more preferably 2.5 (v/v) % or more, further more preferably 2.75 (v/v) % or more, further more preferably 3.0 (v/v) % or more, 3.25 (v/v) % or more, further more preferably 3.5 (v/v) % or more, still further more preferably 3.75 (v/v) % or more, and particularly preferably 4.0 (v/v) % or more, and may be 4.25 (v/v) % or more, 4.3 (v/v) % or more, 4.4 (v/v) % or more, 4.5 (v/v) % or more, 4.6 (v/v) % or more, 4.7 (v/v) % or more, 4.8 (v/v) % or more, 4.9 (v/v) % or more, 5.0 (v/v) % or more, 5.1 (v/v) % or more, 5.2 (v/v) % or more, 5.3 (v/v) % or more, 5.4 (v/v) % or more, 5.5 (v/v) % or more, 5.6 (v/v) % or more, 5.7 (v/v) % or more, 5.8 (v/v) % or more, 5.9 (v/v) % or more, or 6.0 (v/v) % or more. The alcohol content of the beer-taste beverage is preferably 10.0 (v/v) % or less, more preferably 9.0 (v/v) % or less, even more preferably 8.0 (v/v) % or less, still more preferably 7.0 (v/v) % or less, and particularly preferably 6.5 (v/v) % or less, and may be 6.0 (v/v) % or less.

The alcohol content herein is expressed by percentage on a volume/volume basis ((v/v) %). Also, the alcohol content of the beverage can be measured by any known method and can be measured, for example, with a vibrating densimeter.

The alcohol content can be adjusted by appropriately setting, for example, the addition of dilution water or carbonated water, the type of raw material (such as malt, corn grit, or sugar solution), the amount of raw material, the type of enzyme, the amount of enzyme to be added, the timing for enzyme addition, the saccharification time in a preparation tank, the proteolysis time in a preparation tank, the pH in a preparation tank, the pH in a preparation step (wort production step from feeding of malt until before addition of yeast), the amount of acid added for pH adjustment, the timing for pH adjustment (during preparation, during fermentation, at completion of fermentation, before beer filtration, after beer filtration, or the like), the set temperature and retention time in each temperature region in preparation of wort (including during saccharification), the original extract concentration of a pre-fermentation liquid, the original extract concentration in a fermentation step, the fermentation conditions (such as the oxygen concentration, aeration conditions, yeast variety, amount of yeast added, number of yeast grown, timing for removal of yeast, fermentation temperature, fermentation time, pressure setting, and carbon dioxide concentration), and the addition of spirits, brewed alcohol, or the like.

The real extract value of the beer-taste beverage of the present invention is 2.30 mass % or less. The real extract refers to a solid substance itself (soluble evaporation residue) which is dissolved particularly in a fermentable beverage and remains after drying without evaporation, when the beverage is gently heated (after removing insoluble matters such as yeast and protein coagulum by filtration if present) to evaporate all of water, alcohol, carbon dioxide and other volatile components, or a content of the solid substance (mass %). With the real extract value of the beer-taste beverage being set to 2.30 mass % or less, the beverage can be made to have a light body. The real extract value of the beer-taste beverage according to one embodiment of the present invention is preferably 2.20 mass % or less, more preferably 2.10 mass % or less, and even more preferably 2.00 mass % or less, and may be less than 2.00 mass %, 1.95 mass % or less, 1.90 mass % or less, 1.85 mass % or less, 1.80 mass % or less, 1.75 mass % or less, 1.70 mass % or less. 1.65 mass % or less, 1.60 mass % or less, 1.55 mass % or less, 1.50 mass % or less, less than 1.50 mass %, 1.45 mass % or less, 1.40 mass % or less. 1.35 mass % or less, 1.30 mass % or less, 1.25 mass % or less. 1.20 mass % or less, 1.15 mass % or less, 1.10 mass % or less, 1.05 mass % or less. 1.00 mass % or less, 0.95 mass % or less, 0.90 mass % or less, 0.85 mass % or less, or 0.80 mass % or less.

On the other hand, the real extract value of the beer-taste beverage according to one embodiment of the present invention is preferably 0.55 mass % or more, more preferably 0.56 mass % or more, and even more preferably 0.57 mass % or more, or may be 0.58 mass % or more, 0.59 mass % or more. 0.60 mass % or more, 0.65 mass % or more, 0.70 mass % or more, 0.75 mass % or more. 0.80 mass % or more. 0.85 mass % or more, 0.90 mass % or more, 0.95 mass % or more, 1.00 mass % or more, more than 1.00 mass %, 1.05 mass % or more, 1.10 mass % or more, or 1.15 mass % or more, from the viewpoint of ensuring the full bodied taste typical of beer-taste beverages.

The real extract value can be adjusted by appropriately setting, for example, the addition of dilution water or carbonated water, the type of raw material (such as malt, corn grit, or sugar solution), the amount of raw material, the wort filtration time, the pH for wort filtration, the boiling time, the boiling temperature, the amount of spirits added, and the amount of brewed alcohol added.

In addition, the real extract value of the beer-taste beverage according to the present invention can be measured, for example, by a method described in Revised BCOJ Beer Analysis Method (published by Public Interest Incorporated Foundation, The Brewing Society of Japan, edited by [Analysis Committee] Brewery Convention of Japan. Brewers Association of Japan, Enlarged and Revised Edition of 2013).

A content of pyroglutamic acid in the beer-taste beverage according to one embodiment of the present invention is preferably 15 mg/L or more, more preferably 20 mg/L or more, even more preferably 25 mg/L or more, still more preferably 26 mg/L or more, further more preferably 27 mg/L or more, further more preferably 28 mg/L or more, and particularly preferably 29 mg/L or more, and may also be 30 mg/L or more. 31 mg/L or more, 32 mg/L or more, 33 mg/L or more, 34 mg/L or more. 35 mg/L or more, 40 mg/L or more, 45 mg/L or more, 50 mg/L or more, 55 mg/L or more, 60 mg/L or more, 65 mg/L or more, 70 mg/L or more, 75 mg/L or more, 77 mg/L or more, 80 mg/L or more, 85 mg/L or more, 90 mg/L or more, 95 mg/L or more. 100 mg/L or more, 105 mg/L or more, 110 mg/L or more, 115 mg/L or more, 120 mg/L or more, 130 mg/L or more, 140 mg/L or more, 150 mg/L or more, 160 mg/L or more, 170 mg/L or more, 180 mg/L or more, 190 mg/L or more, or 200 mg/L or more, from the viewpoint of imparting a preferred full bodied taste to the beer-taste beverage.

On the other hand, from the viewpoint of suppressing sourness unsuitable for beer-taste beverages, the content of pyroglutamic acid is 300 mg/L or less, preferably 290 mg/L or less, more preferably 280 mg/L or less, even more preferably 270 mg/L or less, still more preferably 260 mg/L or less, and further more preferably 250 mg/L or less, or may be 240 mg/L or less, 230 mg/L or less. 220 mg/L or less. 210 mg/L or less, or 200 mg/L or less.

The pyroglutamic acid may be contained in a raw material for the beer-taste beverage or may be separately added in a production process (for example, a pyroglutamic acid purified product).

The content of pyroglutamic acid can be adjusted by appropriately setting, for example, the addition of dilution water or carbonated water, the addition of a pyroglutamic acid purified product, the type of pyroglutamic acid-containing raw material (such as malt, barley/wheat, corn grit, sugar solution, yeast extract, soybean, pea, or proline purified product), the amount of raw material, the enzyme reaction time in a preparation step (wort production step from feeding of a raw material such as malt until before addition of yeast), the pH in a preparation step, the amount of acid added for pH adjustment, the timing for pH adjustment (during preparation, during fermentation, at completion of fermentation, before beer filtration, after beer filtration, or the like), the set temperature and retention time in each temperature region in preparation of wort (including during saccharification), the original extract concentration of a pre-fermentation liquid, the original extract concentration in a fermentation step, the fermentation conditions (such as the oxygen concentration, aeration conditions, yeast variety, amount of yeast added, number of yeast grown, timing for removal of yeast, fermentation temperature, fermentation time, pressure setting, and carbon dioxide concentration), and the addition of spirits, brewed alcohol, or the like.

The content of pyroglutamic acid herein can be measured, for example, by high-performance liquid chromatography.

The beer-taste beverage according to one embodiment of the present invention has a content of linalool of from 5 to 100 ppb by mass. Adjusting the content of linalool within the above range makes it possible to provide a beer-taste beverage having a less sweet aroma unsuitable for beer-taste beverages while imparting a refreshing aftertaste. Linalool, which is a monoterpene alcohol, is a component having a refreshing sweet aroma like lily-of-the-valley. Linalool is contained in black and green teas, is also known as one of aroma components of hops, and is generally used as a flavoring. The content of linalool is preferably 5 ppb by mass or more, more preferably 6 ppb by mass or more, even more preferably 7 ppb by mass or more, still more preferably 8 ppb by mass or more, further more preferably 9 ppb by mass or more, further more preferably 10 ppb by mass or more, further more preferably more than 10 ppb by mass, further more preferably 11 ppb by mass or more, further more preferably 12 ppb by mass or more, further more preferably 13 ppb by mass or more, further more preferably 14 ppb by mass or more, further more preferably 15 ppb by mass or more, further more preferably 16 ppb by mass or more, further more preferably 17 ppb by mass or more, further more preferably 18 ppb by mass or more, further more preferably 19 ppb by mass or more, and particularly preferably 20 ppb by mass or more, and may be 21 ppb by mass or more, 22 ppb by mass or more, 23 ppb by mass or more. 24 ppb by mass or more, 25 ppb by mass or more, 26 ppb by mass or more, 27 ppb by mass or more, 28 ppb by mass or more, 29 ppb by mass or more, 30 ppb by mass or more, 32 ppb by mass or more, 34 ppb by mass or more, 36 ppb by mass or more, 38 ppb by mass or more, or 40 ppb by mass or more, from the viewpoint of imparting a refreshing aftertaste.

On the other hand, the content of linalool is preferably 100 ppb by mass or less, more preferably 95 ppb by mass or less, even more preferably 90 ppb by mass or less, and still more preferably 85 ppb by mass or less, and may be 84 ppb by mass or less, 83 ppb by mass or less, 82 ppb by mass or less, 81 ppb by mass or less, 80 ppb by mass or less. 75 ppb by mass or less. 70 ppb by mass or less, or 65 ppb by mass or less, from the viewpoint of suppressing a sweet aroma unsuitable for beer-taste beverages.

The content of linalool in the beer-taste beverage of the present invention can be controlled by, for example, adjusting the amount of linalool added, or adjusting the variety and used amount of a raw material (for example, hops or the like) having a high linalool content, the timing for addition of the raw material, or the like. In addition, the content of linalool can be measured using a gas chromatography-mass spectrometry apparatus (GC-MS) described in J. Agric. Food Chem., 2013, 61 (47), pp 11303 to 1131 (Characterization of the Key Aroma Compounds in Two Bavarian Wheat Beers by Means of the Sensomics Approach).

A total nitrogen amount of the beer-taste beverage according to one embodiment of the present invention is preferably 10 mg/100 mL or more, more preferably 15 mg/100 mL or more, even more preferably 17 mg/100 mL or more, still more preferably 19 mg/100 mL or more, and particularly preferably 20 mg/100 mL or more, and may be 21 mg/100 mL or more, 22 mg/100 mL or more. 23 mg/100 mL or more, 24 mg/100 mL or more, 25 mg/100 mL or more, 26 mg/100 mL or more, 27 mg/100 mL or more, 28 mg/100 mL or more, 29 mg/100 mL or more, 30 mg/100 mL or more, 31 mg/100 mL or more, 32 mg/100 mL or more, 33 mg/100 mL or more, 34 mg/100 mL or more, 35 mg/100 mL or more, 36 mg/100 mL or more, 37 mg/100 mL or more, 38 mg/100 mL or more. 39 mg/100 mL or more, 40 mg/100 mL or more, 45 mg/100 mL or more. 50 mg/100 mL or more. 55 mg/100 mL or more, 60 mg/100 mL or more, 65 mg/100 mL or more, 70 mg/100 mL or more, 75 mg/100 mL or more, or 80 mg/100 mL or more, from the viewpoint of providing a beer-taste beverage in which at least one of a barley/wheat-derived rich taste, a full bodied taste, and taste thickness is further improved.

On the other hand, the total nitrogen amount of the beer-taste beverage according to one embodiment of the present invention is preferably 100 mg/100 mL or less, more preferably 95 mg/100 mL or less, even more preferably 90 mg/100 mL or less, and particularly preferably 85 mg/100 mL or less, and may be 84 mg/100 mL or less, 83 mg/100 mL or less, 82 mg/100 mL or less, 81 mg/100 mL or less, 80 mg/100 mL or less, 78 mg/100 mL or less, 76 mg/100 mL or less, 74 mg/100 mL or less. 72 mg/100 mL or less, or 70 mg/100 mL or less, from the viewpoint of providing a beverage which is hard to give satiety.

The "total nitrogen amount" in the present invention is a total amount of all nitrogen compounds such as proteins and amino acids.

The total nitrogen amount of the beer-taste beverage of the present invention can be controlled by adjusting the used amounts of raw materials assimilable by yeast. Specifically, the total nitrogen amount can be increased by increasing the used amount of malt or the like having a high nitrogen content. Examples of the raw materials having a high nitrogen content include malt, soybean, yeast extract, pea, and ungerminated grain. Examples of the ungerminated grain include ungerminated barley, wheat, rye, wild oat, oat, adlay, oat, soybean, and pea. Other examples of the ungerminated grain include corn (corn protein and the like), rice, milk raw materials such as raw milk, skim milk powder, and whey, collagen peptide, and yeast extract. The total nitrogen amount can be adjusted by appropriately setting, for example, not only the addition of dilution water or carbonated water and selection of the amount or type of raw material used, but also the type of enzyme, the amount of enzyme added (also including proteolytic enzyme and the like), the timing for enzyme addition, the proteolysis time in a preparation tank, the pH in a preparation tank, the pH in a preparation step (wort production step from feeding of malt until before addition of yeast), the time for wort filtration, the set temperature and retention time in each temperature region in preparation of wort, the boiling time and pH in a boiling step, the original extract concentration of a pre-fermentation liquid, the original extract concentration in a fermentation step, the fermentation conditions (such as the oxygen concentration, aeration conditions, yeast variety, amount of yeast added, the number of yeast grown, removal timing for yeast, fermentation temperature, fermentation time, pressure setting, and carbon dioxide concentration), the cooling timing, the cooling temperature, the cooling time, the conditions for beer filtration (such as flow rate and temperature), the beer filtration method (diatomaceous earth, membrane, sheet, cartridge, filter, or the like), and the stabilizer added during beer filtration (such as silica gel. PVPP (polyvinyl polypyrrolidone), bentonite, tannin, bentonite, clay, or acid clay).

In addition, the total nitrogen amount of the beer-taste beverage according to the present invention can be measured, for example, by a method described in Revised BCOJ Beer Analysis Method (published by Public Interest Incorporated Foundation, The Brewing Society of Japan, edited by [Analysis Committee] Brewery Convention of Japan. Brewers Association of Japan, Enlarged and Revised Edition of 2013).

A total polyphenol amount of the beer-taste beverage according to one embodiment of the present invention is preferably 25 mass ppm or more, more preferably 30 mass ppm or more, even more preferably 35 mass ppm or more, still more preferably 40 mass ppm or more, further more preferably 45 mass ppm or more, further more preferably 50 mass ppm or more, further more preferably 55 mass ppm or more, and particularly preferably 60 mass ppm or more, and may be 65 mass ppm or more, 70 mass ppm or more, 75 mass ppm or more, 80 mass ppm or more, 85 mass ppm or more. 90 mass ppm or more, 95 mass ppm or more, 100 mass ppm or more, 110 mass ppm or more, 120 mass ppm or more, 130 mass ppm or more. 140 mass ppm or more. 150 mass ppm or more, 160 mass ppm or more, 170 mass ppm or more, 180 mass ppm or more, 190 mass ppm or more, or 200 mass ppm or more, from the viewpoint of providing a beer-taste beverage in which at least one of a rich taste, a full bodied taste, and taste thickness suitable for beer-taste beverages is further improved.

On the other hand, the total polyphenol amount of the beer-taste beverage according to one embodiment of the present invention is preferably 250 ppm by mass or less, more preferably 240 ppm by mass or less, even more preferably 230 ppm by mass, and particularly preferably 220 ppm by mass, and may be 210 ppm by mass or less, 200 ppm by mass or less. 195 ppm by mass or less, 190 ppm by mass or less, 180 ppm by mass or less, 175 ppm by mass or less, 170 ppm by mass or less, 165 ppm by mass or less, 160 ppm by mass or less, 155 ppm by mass or less. 150 ppm by mass or less, 145 ppm by mass or less, 140 ppm by mass or less, 135 ppm by mass or less, 130 ppm by mass or less, or 120 ppm by mass or less, from the viewpoint of providing a beverage which is hard to give satiety.

The polyphenol herein refers to a compound in which two or more hydrogen atoms of an aromatic hydrocarbon are substituted with hydroxyl groups. Examples of the polyphenol include flavonol, isoflavone, tannin, catechin, quercetin, and anthocyanin.

The "total polyphenol amount" in the present invention is the total amount of these polyphenols contained in the beer-taste beverage.

The total polyphenol amount can be adjusted by appropriately setting, for example, the addition of dilution water or carbonated water, the type of raw material (such as malt, corn grit, or sugar solution), the amount of raw material, the type of enzyme, the amount of enzyme added, the timing for enzyme addition, the polyphenol polymerization conditions in a preparation tank (such as temperature and stirring rate), the pH in a preparation tank, the pH in a preparation step (wort production step from feeding of malt until before addition of yeast), the time for wort filtration, the set temperature and retention time in each temperature region in preparation of wort (including during saccharification), the original extract concentration of a pre-fermentation liquid, the original extract concentration in a fermentation step, the fermentation conditions (such as the oxygen concentration, aeration conditions, yeast variety, amount of yeast added, number of yeast grown, timing for removal of yeast, fermentation temperature, fermentation time, pressure setting, and carbon dioxide concentration), the cooling timing, the cooling temperature, the cooling time, the beer filtration method (diatomaceous earth, membrane, sheet, cartridge, filter, or the like), the activated carbon, and the stabilizer added during beer filtration (such as silica gel. PVPP (polyvinyl polypyrrolidone), bentonite, tannin, or bentonite).

In addition, the total polyphenol amount of the beer-taste beverage of the present invention can be controlled by adjusting the used amount of a raw material having a high polyphenol content, such as malt or malt husks (hulls). Specifically, the total polyphenol amount can be increased by increasing the used amount of a raw material with a high polyphenol content, such as malt.

In general, malt with husks and the like have high nitrogen and polyphenol contents, and soybean, yeast extract, pea, corn, processed corn products (corn grit, corn protein, and the like), wheat, wheat malt, and the like have a high nitrogen content but a low polyphenol content. Therefore, the total nitrogen amount and total polyphenol amount of the beer-taste beverage can be increased or decreased by adjusting blending proportions of the raw materials. Representative methods (1) to (4) for increasing or decreasing the total nitrogen amount and total polyphenol amount will be described below.

(1) The total nitrogen amount and total polyphenol amount of the beer-taste beverage are increased by increasing the used amount of malt with husks or the like.

(2) The total nitrogen amount of the beer-taste beverage is increased or decreased while the total polyphenol amount is maintained by increasing or decreasing the used amount of soybean, yeast extract or the like.

(3) The total polyphenol amount is increased while the total nitrogen amount is maintained by increasing the used amount of malt with husks or the like and decreasing the used amount of soybean, yeast extract or the like.

(4) The total polyphenol amount is decreased while the total nitrogen amount is maintained by decreasing the used amount of malt with husks or the like and increasing the used amount of soybean, yeast extract or the like.

In addition, the total polyphenol amount of the beer-taste beverage of the present invention can be measured, for example, by a method described in Revised BCOJ Beer Analysis Method (published by Public Interest Incorporated Foundation, The Brewing Society of Japan, edited by [Analysis Committee] Brewery Convention of Japan, Brewers Association of Japan, Enlarged and Revised Edition of 2013).

In the beer-taste beverage of the present invention, at least part of the nitrogen or polyphenol is preferably derived from malt, from the viewpoint of further improving at least one of a rich taste, a full bodied taste, and taste thickness suitable for beer-taste beverages.

In addition, in the beer-taste beverage of the present invention, at least part of the nitrogen or polyphenol may be derived from soybean, yeast extract, pea, corn, processed corn product (corn grit or the like), wheat, wheat malt, or the like, from the viewpoint of further improving a clear taste typical of beer-taste beverages.

The beer-taste beverage according to one embodiment of the present invention may further contain spirits (distilled alcoholic beverage) derived from grain as an alcohol component.

Here, the "spirits" means an alcoholic beverage produced by saccharifying grain, such as barley/wheat, rice, buckwheat, corn, potato, or sugar cane as a raw material using malt or, as necessary, an enzymatic agent, fermenting the saccharified product using yeast, and then distilling the fermented product. As the grain which is a raw material for the spirits, a plant belonging to the family Gramineae is preferable, and barley/wheat is more preferable.

A carbohydrate content of the beer-taste beverage according to one embodiment of the present invention can be set according to the properties desired to be imparted to the beverage, and may be, for example, 2.0 g/100 mL or less, 1.9 g/100 mL or less, 1.8 g/100 mL or less, 1.7 g/100 mL or less, 1.6 g/100 mL or less, 1.5 g/100 mL or less, less than 1.5 g/100 mL, 1.4 g/100 mL or less, 1.3 g/100 mL or less. 1.2 g/100 mL or less, 1.1 g/100 mL or less, 1.0 g/100 mL or less, less than 1.0 g/100 mL. 0.95 g/100 mL or less, 0.9 g/100 mL or less, 0.85 g/100 mL or less, 0.8 g/100 mL or less, 0.75 g/100 mL or less, 0.7 g/100 mL or less, 0.65 g/100 mL or less, 0.6 g/100 mL or less, 0.55 g/100 mL or less, or 0.5 g/100 mL, and may be 0.1 g/100 mL or more, 0.2 g/100 mL or more. 0.3 g/100 mL or more, 0.4 g/100 mL or more, 0.5 g/100 mL or more, more than 0.5 g/100 mL, 0.55 g/100 mL or more. 0.6 g/100 mL or more. 0.65 g/100 mL or more, 0.7 g/100 mL or more, 0.75 g/100 mL or more, 0.8 g/100 mL or more, 0.85 g/100 mL or more, 0.9 g/100 mL or more, 0.95 g/100 mL or more, 1.0 g/100 mL or more, 1.1 g/100 mL or more, 1.2 g/100 mL or more, 1.3 g/100 mL or more, 1.4 g/100 mL or more, or 1.5 g/100 mL or more.

The "carbohydrate" herein refers to a carbohydrate based on the Nutrition Labeling Standards for Foods (Ministry of Health, Labour and Welfare Notification No. 176, 2003, Consumer Affairs Agency Notification No. 8. Partial Revision, Sep. 27, 2013) and specifically means a material obtained by removing protein, lipid, dietary fiber, ash, alcohol content, and water from the target food. Thus, the carbohydrate content of a food can be calculated by subtracting the amounts of protein, lipid, dietary fiber, ash, and water from the weight of the food.

Here, the amounts of protein, lipid, dietary fiber, ash, and water can be measured by the methods described in the Nutrition Labeling Standards. Specifically, the amount of protein can be measured by a method of quantitative conversion of nitrogen, the amount of lipid can be measured by an ether extraction method, the amount of dietary fiber can be measured by the Prosky method, the amount of ash can be measured by a direct ashing method, and the amount of water can be measured by a method of heating and drying under reduced pressure.

The carbohydrate content of the beer-taste beverage according to one embodiment of the present invention can be adjusted by appropriately setting, for example, the addition of dilution water or carbonated water, the type of enzyme (polysaccharide degrading enzyme, isomerizing enzyme, or the like), the amount of enzyme added, and the timing for addition, the set temperature, pH and retention time in each temperature region in preparation of a saccharified liquid, the composition of a pre-fermentation liquid (original extract concentration, sugar composition, protein content, dietary fiber content, ash, and the like), various conditions for a fermentation step (such as oxygen concentration, aeration condition, yeast variety, amount of yeast added, number of yeast grown, timing for removal of yeast, fermentation temperature, fermentation time, pressure setting, carbon dioxide concentration, type of enzyme, amount of enzyme added, and timing for enzyme addition), the cooling timing, the cooling temperature, the cooling time, and the like.

The pH of the beer-taste beverage according to one embodiment of the present invention is not particularly limited, but is preferably 3.0 or more, more preferably 3.2 or more, even more preferably 3.4 or more. 3.5 or more, still more preferably 3.6 or more, and further more preferably 3.7 or more, and may be 3.9 or more, or 4.1 or more, from the viewpoint of improving flavor of the beverage. In addition, from the viewpoint of suppressing the generation of microorganisms, the pH of the beer-taste beverage is preferably 5.0 or less, more preferably 4.9 or less, even more preferably 4.8 or less, still more preferably 4.7 or less, and particularly preferably 4.6 or less, and may be 4.55 or less, 4.50 or less, 4.45 or less, 4.40 or less, 4.35 or less, or 4.30 or less.

The pH can be adjusted by appropriately setting, for example, the addition of dilution water or carbonated water, the type of raw material (such as malt, corn grit, or sugar solution), the amount of raw material, the type of enzyme, the amount of enzyme added, the timing for enzyme addition, the saccharification time in a preparation tank, the proteolysis time in a preparation tank, the pH in a preparation tank, the pH in a preparation step (wort production step from feeding of malt until before addition of yeast), the type of acid used in pH adjustment (lactic acid, phosphoric acid, malic acid, tartaric acid, citric acid, or the like), the added amount of acid used in pH adjustment, timing for pH adjustment (during preparation, during fermentation, at completion of fermentation, before beer filtration, after beer filtration, or the like), the set temperature and retention time in each temperature region in preparation of wort (including during saccharification), the original extract concentration of a pre-fermentation liquid, the original extract concentration in a fermentation step, the fermentation conditions (such as oxygen concentration, aeration conditions, yeast variety, amount of yeast added, number of yeast grown, timing for removal of yeast, fermentation temperature, fermentation time, pressure setting, and carbon dioxide concentration), the cooling timing, the cooling temperature, and the cooling time.

In the beer-taste beverage according to one embodiment of the present invention, a content of purines is preferably 0.5 mg/100 mL or more, 0.6 mg/100 mL or more, 0.7 mg/100 mL or more, 0.8 mg/100 mL or more, 0.9 mg/100 mL or more, 1.0 mg/100 mL or more, 1.1 mg/100 mL or more, 1.2 mg/100 mL or more. 1.3 mg/100 mL or more, 1.4 mg/100 mL or more, 1.5 mg/100 mL or more, or 1.6 mg/100 mL or more, from the viewpoint of imparting a delicious taste of barley/wheat.

On the other hand, from the viewpoint of health trend, the content of purines is preferably 10.0 mg/100 mL or less, 9.0 mg/100 mL or less, 8.0 mg/100 mL or less. 7.0 mg/100 mL or less, 6.5 mg/100 mL or less, 6.0 mg/100 mL or less, 5.9 mg/100 mL or less, 5.8 mg/100 mL or less, 5.7 mg/100 mL or less, 5.6 mg/100 mL or less, 5.5 mg/100 mL or less, 5.4 mg/100 mL or less, 5.3 mg/100 mL or less, 5.2 mg/100 mL or less, 5.1 mg/100 mL or less, or 5.0 mg/100 mL or less.

The "purines" herein means four purine bases, i.e., adenine, xanthine, guanine, and hypoxanthine. In the quantification of the purines, it is difficult to quantify adenylic acid and adenosine separately from "adenine", and it is also difficult to quantify guanylic acid and guanosine separately from "guanine". Thus, the "adenine" includes an adenine base, as well as adenylic acid and adenosine. The "guanine" includes a guanine base, as well as guanylic acid and guanosine.

The content of purines in the beer-taste beverage is a total content of the above-described four purine bases, and means a value as measured by a detection method using LC-MS/MS ("Guide to Microanalysis of Purines in Alcoholic Beverages", Japan Food Research Laboratories, Internet (https://www.jfrl.or.jp/storage/file/news_vol4_no23.pdf, searched in December 2021)) after perchloric acid treatment.

In the beer-taste beverage according to one embodiment of the present invention, a ratio [(X)/(Y)] of the content of pyroglutamic acid (X) (unit: mg/L) to the content of linalool (Y) (unit: ppb by mass) is 0.5 or more, preferably 1.0 or more, more preferably 1.3 or more, even more preferably 1.5 or more, still more preferably 1.9 or more, and particularly preferably 2.0 or more, and may be 2.5 or more, 3.0 or more. 3.5 or more, 4.0 or more, 4.5 or more, 5.0 or more, 5.5 or more, or 6.0 or more, from the viewpoint of making the full bodied taste good.

On the other hand, the ratio [(X)/(Y)] of the content of pyroglutamic acid (X) (unit: mg/L) to the content of linalool (Y) (unit: ppb by mass) is 15 or less, preferably 14.5 or less, more preferably 14 or less, even more preferably 13.5 or less, still more preferably 13 or less, further more preferably 12.5 or less, more preferably 12 or less, more preferably 11.5 or less, more preferably 11 or less, more preferably 10.5 or less, and particularly preferably 10 or less, and may be 9.9 or less, 9.8 or less, 9.7 or less, 9.6 or less, 9.5 or less, 9.4 or less. 9.3 or less, 9.2 or less. 9.1 or less, or 9.0 or less, from the viewpoint of providing a beer-taste beverage having a refreshing aftertaste.

In another embodiment, the ratio [(X)/(Y)] of the content of pyroglutamic acid (X) (unit: mg/L) to the content of linalool (Y) (unit: ppb by mass) is preferably 32 or less, 30 or less, 28 or less, 25 or less. 23 or less, 20 or less, 19 or less, 18 or less, 17 or less. 16 or less, 15 or less, 14.5 or less, 14 or less, 13.5 or less, 13 or less, 12.5 or less, 12 or less. 11.5 or less, 11 or less, 10.5 or less, 10 or less, 9.9 or less. 9.8 or less, 9.7 or less, 9.6 or less. 9.5 or less, 9.4 or less, 9.3 or less, 9.2 or less, 9.1 or less, or 9.0 or less, from the viewpoint of providing a beer-taste beverage having a refreshing aftertaste.

In the beer-taste beverage according to one embodiment of the present invention, a ratio [(X)/(Z)] of the content of pyroglutamic acid (X) (unit: mg/L) to the carbohydrate content (Z) (unit: g/100 mL) is 30 or more, preferably 35 or more, more preferably 40 or more, even more preferably 45 or more, still further more preferably 50 or more, further more preferably 55 or more, and particularly preferably 60 or more, and may be 70 or more, 75 or more, 80 or more, 85 or more, 90 or more, 95 or less, 100 or more, 110 or more, 120 or more, 130 or more, 140 or more, or 150 or more, from the viewpoint of providing a beer-taste beverage having a good balance between the full bodied taste and the quaffability.

On the other hand, the [(X)/(Z)] of the content of pyroglutamic acid (X) (unit: mg/L) to the carbohydrate content (Z) (unit: g/100 mL) is 300 or less, preferably 280 or less, more preferably 270 or less, still more preferably 260 or less, particularly preferably 250 or less, and may be 240 or less, 230 or less, 220 or less, 210 or less, 200 or less, 190 or less, or 180 or less, from the viewpoint of suppressing sourness unsuitable for beer-taste beverages.

In one embodiment, the ratio [(X)/(Z)] may be 450 or less, 440 or less. 435 or less, 430 or less, 400 or less. 350 or less. 300 or less. 280 or less, 270 or less, 260 or less, 250 or less, 240 or less, 230 or less. 220 or less, 210 or less, 200 or less, 190 or less, or 180 or less.

In the beer-taste beverage according to one embodiment of the present invention, a ratio [(Y)/(Z)] of the content of linalool (Y) (unit: ppb by mass) to the carbohydrate content (Z) (unit: g/100 mL) is 5 or more, preferably 10 or more, more preferably 15 or more, and even more preferably 20 or more, and may be 25 or more, 30 or more, 35 or more, 40 or more, 45 or more, 50 or more, 55 or more, or 60 or more, from the viewpoint of providing a beverage having a refreshing aftertaste and quaffability.

On the other hand, from the viewpoint of not imparting a sweet aroma unsuitable for beer-taste beverages, the ratio [(Y)/(Z)] of the content of linalool (Y) (unit: ppb by mass) to the carbohydrate content (Z) (unit: g/100 mL) is 200 or less, preferably 180 or less, more preferably 160 or less, even more preferably 140 or less, still more preferably 120 or less, and particularly preferably 100 or less, and may be 95 or less, 90 or less, 85 or less, 80 or less, 75 or less, or 70 or less.

In the beer-taste beverage according to one embodiment of the present invention, a product (A×B) of the total polyphenol amount (A) (unit: ppm by mass) and the total nitrogen amount (B) (unit: mg/100 mL) is 200 or more, preferably 250 or more, more preferably 300 or more, even more preferably 350 or more, and particularly preferably 385 or more, and may be 390 or more, 450 or more, 500 or more, 600 or more. 700 or more, 800 or more, 900 or more, 1000 or more, 1400 or more, 1500 or more, 1600 or more, 1800 or more, 2000 or more, 4000 or more, 6000 or more, 8000 or more, 10000 or more. 12000 or more, or 14000 or more, from the viewpoint of providing a beverage having a full bodied taste.

On the other hand, the product (A×B) of the total polyphenol amount (A) (unit: ppm by mass) and the total nitrogen amount (B) (unit: mg/100 mL) is 25000 or less, preferably 23000 or less, more preferably 20000 or less, even more preferably 18000 or less, still more preferably 16000 or less, and particularly preferably 14000 or less, and may be 12000 or less, 10000 or less, 9500 or less, 9000 or less, 8500 or less, 8000 or less, 7500 or less, 7000 or less, 6500 or less, or 6000 or less, from not imparting the satiety unsuitable for beer-taste beverages.

In the beer-taste beverage according to one embodiment of the present invention, a ratio [(A)/(B)] of the total polyphenol amount (A) (unit: ppm by mass) to the total nitrogen amount (B) (unit: mg/100 mL) is 0.5 or more, preferably 0.6 or more, more preferably 0.7 or more, even more preferably 0.8 or more, still more preferably 0.9 or more, and particularly preferably 1.0 or more, and may be 1.2 or more, 1.4 or more. 1.6 or more, 1.8 or more, or 2.0 or more, from the viewpoint of providing a beverage having a full bodied taste while having suppressed "heavy" mouthfeel.

On the other hand, the ratio [(A)/(B)] of the total polyphenol amount (A) (unit: ppm by mass) to the total nitrogen amount (B) (unit: mg/100 mL) is 4.5 or less, preferably 4.4 or less, more preferably 4.3 or less, even more preferably 4.2 or less, still more preferably 4.1 or less, and particularly preferably 4.0 or less, and may be 3.9 or less, 3.8 or less, 3.7 or less, 3.6 or less, or 3.5 or less, from not imparting the satiety unsuitable for beer-taste beverages.

In the beer-taste beverage according to one embodiment of the present invention, a ratio [(B)/(Z)] of the total nitrogen amount (B) (unit: mg/100 mL) to the carbohydrate content (Z) (unit: g/100 mL) is 10 or more, preferably 15 or more, more preferably 20 or more, even more preferably 25 or more, and particularly preferably 30 or more, and may be 35 or more, 40 or more, 45 or more, 50 or more, 55 or more, or 60 or more, from the viewpoint of providing a beer-taste beverage having a good balance between the full bodied taste and the quaffability.

On the other hand, the ratio [(B)/(Z)] of the total nitrogen amount (B) (unit: mg/100 mL) to the carbohydrate content (Z) (unit: g/100 mL) is 200 or less, preferably 190 or less, more preferably 180 or less, even more preferably 170 or less, and particularly preferably 160 or less, and may be 150 or less, 145 or less, 140 or less, 135 or less, 130 or less, 125 or less, 120 or less, 115 or less, 110 or less, 105 or less, or 100 or less, from not imparting the satiety unsuitable for beer-taste beverages.

The beer-taste beverage according to one embodiment of the present invention is suitable for an embodiment of packaging. Examples of a container include a bottle, a PET bottle, a can, and a barrel. Particularly, a can, a bottle, and a PET bottle are preferable from the viewpoint of ease of carrying.

When a colorless and transparent bottle or PET bottle is used, the beer-taste beverage is exposed to sunlight or light from a fluorescent lamp, unlike the case where a normal can or a colored bottle is used.

Optional additive raw materials such as grains and sweeteners, which can be used in production of the beer-taste beverage of the present invention, will be described in detail in "1.1 Raw material".

1.1 Raw Material

Main raw materials for the beer-taste beverage according to one embodiment of the present invention are water and malt, but hop is preferably used. In addition, fruits, pericarps, barks, leaves, flowers, stems, roots, and seeds of gramineous plants such as barley/wheat and plants other than the gramineous plants, sweeteners, water-soluble dietary fibers, bittering agents or bitterness imparting agents, antioxidants, flavorings, acidulants, salts, and the like may be used.

The malt refers to malt obtained by germinating seeds of barley and the like, such as barley, wheat, rye, wild oat, oat, adlay, or oat, drying the germinated seeds, and removing roots, and may be from any production area and of any variety.

In one embodiment of the present invention, the malt used is preferably barley malt. Barley malt is one of the malts most commonly used as a raw material for Japanese beer-taste beverages. There are several types of barley, such as two-rowed barley and six-rowed barley, and any of them may be used. Furthermore, in addition to ordinary malt, colored malt or the like can also be used. When colored malt is used, different types of colored malts may be appropriately used in combination, or one type of colored malt may be used.

The malt used in the beer-taste beverage of the present invention preferably has a modification of 80% or more. If the modification is less than 80%, viscosity or turbidity of the wort increases, and production efficiencies such as wort filterability and beer filterability deteriorate. Therefore, malt having a modification of 80% or more is preferably used. In Examples and Comparative Examples which will be described below, malt having a modification of 80% or more was used. The modification can be measured by the method described in MEBAK Raw Materials, 3.1.3.8 Modification and Homogeneity (Calcofluor Carlsberg Method-EBC) in Barley Adjuncts Malt Hops And Hop Products Published by the Chairman Dr. Fritz Jacob Self-published by MEBAK 85350 Freising-Weihenstephan, Germany 2011.

In the beer-taste beverage according to one embodiment of the present invention, the malt used is preferably selected as appropriate in accordance with the desired chromaticity of the beer-taste beverage, and one kind of malt may be selected, or two or more kinds thereof may be selected in combination.

The malt contains pyroglutamic acid, a nitrogen compound, and a polyphenol. Therefore, in the present invention, it is preferable to set a ratio of the malt in the raw material within a certain range, and each of the pyroglutamic acid, the total nitrogen amount, and the total polyphenol amount of the beer-taste beverage of the present invention falls within the range defined in the present invention. Specifically, the malt ratio (ratio of all malt used) is preferably 50 mass % or more, and may be 51 mass % or more, 52 mass % or more, 53 mass % or more, 54 mass % or more. 55 mass % or more, 56 mass % or more, 57 mass % or more, 58 mass % or more, 59 mass % or more, 60 mass % or more, 61 mass % or more. 62 mass % or more, 63 mass % or more, 64 mass % or more. 65 mass % or more, 66 mass % or more, more than 66 mass %, 67 mass % or more, 70 mass % or more, 80 mass % or more, 90 mass % or more, or 100 mass %. By improving the malt ratio, it is possible to produce a beer-taste beverage in which a rich taste derived from malt and a delicious taste of barley/wheat can be more strongly perceived.

An excessively high malt ratio is likely to result in an unsuitable satiety. Therefore, the malt ratio of the beer-taste beverage according to one embodiment of the present invention is less than 100 mass %. The malt ratio of the beer-taste beverage according to another embodiment of the present invention is 90 mass % or less. The malt ratio of the beer-taste beverage according to still another embodiment of the present invention is 66.6 mass % or less. In addition to the above, the malt ratio of the beer-taste beverage according to one embodiment of the present invention may be, for example, less than 100 mass %, 95 mass % or less, 90 mass % or less, 85 mass % or less. 80 mass % or less, 78 mass % or less, 76 mass % or less, 75 mass % or less, less than 75 mass %, 74 mass % or less. 73 mass % or less, 72 mass % or less. 71 mass % or less, 70 mass % or less, 69 mass % or less, 68 mass % or less, less than 67 mass %, 67 mass % or less, 66.6 mass % or less, less than 66.6 mass %, 66 mass % or less, 65 mass % or less, 64 mass % or less, 63 mass % or less, 62 mass % or less, 61 mass % or less, 60 mass % or less, 59 mass % or less, 58 mass % or less, 57 mass % or less. 56 mass % or less, 55 mass % or less, 54 mass % or less, 53 mass % or less, or 52 mass % or less.

The "malt ratio" herein means a value calculated according to the Interpretation Notice on the Liquor Tax Law and the Administrative Ordinance Related to Alcoholic Beverages and the like enforced on Apr. 1, 2018.

When the malt ratio is suppressed, it is preferable to increase amounts of raw materials (carbon source and nitrogen source), other than malt, which are assimilable by yeast. Examples of the carbon source as the raw material assimilable by yeast include monosaccharides, disaccharides, trisaccharides, sugar solutions thereof, and liquid sugars containing carbon sources. Examples of the nitrogen source as the raw material assimilable by yeast include yeast extract, soybean protein, malt, soybean, yeast extract, pea, wheat malt, ungerminated grains, and decomposition products thereof. Examples of the ungerminated grains include ungerminated barley, wheat, rye, wild oat, oat, adlay, and oat, rice (such as white rice and brown rice), corn, kaoliang, potato, legumes (such as soybeans and peas), buckwheat, sorghum, foxtail millet, and Japanese millet. In addition, starches obtained from these grains and extracts thereof may be used.

The fruits, pericarps, barks, leaves, flowers, stems, roots, and seeds of plants other than gramineous plants such as barley/wheat, which can be used as the raw materials, are not particularly limited, and examples of plants other than gramineous plants include citrus fruits, soft fruits, herbs, and spices. Examples of the citrus fruit include oranges, Yuzu (citrons), lemons, limes, mandarin oranges, grapefruits, Citrus iyo, kumquat, Kabosu (Citrus sphaerocarpa), bitter orange, shekwasha, and Citrus sudachi. Examples of the soft fruit include peaches, grapes, bananas, apples, grapes, pineapples, strawberries, pears, muscat, and cassis. Examples of the herb and spice include coriander, pepper, fennel, Sichuan pepper, Sansho pepper, cardamom, caraway, nutmeg, mace, juniper berry, allspice, vanilla, elderberry, grains of paradise, anise, and star anise.

The above plants may be used as they are, may be used after being crushed, may be used after being extracted with a solvent such as water or ethanol, or may be used after being squeezed (fruit juice or the like). These plants may be used alone, or two or more thereof may be used in combination.

The above plants can be used as appropriate in accordance with the preference of the consumer, but, in order to enjoy a clear and refreshing taste typical of beer, the above citrus fruits, soft fruits, herbs, and spices are preferably not used at all or used in minimum amounts as raw materials. In particular, cassis or cassis juice is preferably not used at all or used in a minimum amount in the raw materials, because cassis gives an unsuitable milky aroma into beer.

Examples of the form of the hops used in one embodiment of the present invention include pellet hops, powdered hops, and hop extract. In addition, the hops used may be a processed hop product, such as isomerized hops or reduced hops.

An amount of the hops added is appropriately adjusted and is preferably from 0.0001 to 1 mass % based on the total amount of the beverage. In addition, a beer-taste beverage made using hops as a raw material is a beverage containing iso-α-acid, which is a component derived from hops.

A bitterness value of the beer-taste beverage of the present invention is not particularly limited, and is preferably 5.0 BUs or more. The "bitterness value" herein refers to an index of bitterness caused by iso-α-acids such as isohumulone. The bitterness value can be measured according to the method described in the section "BCOJ Beer Analysis Method (revised on Nov. 1, 2004), 8.15 Bitterness Value". Specifically, the bitterness value (BUs) can be obtained by addition of an acid to a degassed sample, extraction with isooctane, measurement of the absorbance of the obtained isooctane layer at 275 nm with isooctane as a control, and multiplication of the measured absorbance by a factor.

The bitterness value of the beer-taste beverage of the present invention is preferably 5.0 BUs or more, more preferably 10.0 BUs or more, even more preferably 12.0 BUs or more, still more preferably 13.0 BUs or more, further more preferably 14.0 BUs or more, and further more preferably 15.0 BUs or more, and is 15.0 BUs or more, 16.0 BUs or more, 17.0 BUs or more, 18.0 BUs or more, 19.0 BUs or more, 20.0 BUs or more, 21.0 BUs or more, or 22.0 BUs or more.

In addition, the bitterness value of the beer-taste beverage of the present invention is preferably 45.0 BUs or less, more preferably 40.0 BUs or less, even more preferably 37.5 BUs or less, still more preferably 35.0 BUs or less, and further more preferably 32.5 BUs or less, and may be 30.0 BUs or less, 27.5 BUs or less, 26.0 BUs or less, or 25.0 BUs or less.

The bitterness value depends on the content of iso-α-acid in the beverage, and the iso-α-acid is a bittering component contained in a large amount in the hop. Therefore, a beverage having a predetermined bitterness value can be produced by controlling the amount of hops used.

Examples of the sweetener include commercially available saccharified liquids obtained by degrading starch derived from grain with an acid, an enzyme, or the like, saccharides such as sucrose, lactose, and commercially available starch syrup; tri- or higher saccharides; sugar alcohols: isomerized sugars; natural sweeteners, such as *stevia*; and artificial sweeteners.

These saccharides may be in the form of a liquid, such as a solution, or a solid, such as a powder.

In addition, there are no particular limitations on the type of raw material grain for starch, the method of purifying starch, and the conditions for treatment of hydrolysis with an enzyme or an acid and the like. For example, a saccharide with increased ratio of maltose obtained by appropriately setting conditions for hydrolysis with an enzyme or an acid may be used. In addition, sucrose, fructose, glucose, maltose, trehalose, maltotriose, maltotetraose, isomaltose, isomaltotriose, isomaltotetraose, and solutions (sugar solutions) thereof can also be used.

In addition, examples of the artificial sweetener include aspartame, acesulfame potassium (acesulfame K), sucralose, and neotame.

These sweeteners may be used alone, or two or more thereof may be used in combination.

In the beer-taste beverage according to one embodiment of the present invention, the carbohydrate content is in the above-described range, and the taste thickness can be ensured. Therefore, a content of dietary fiber is preferably less than 0.5 g/100 mL. The content of dietary fiber in the beer-taste beverage according to one embodiment of the present invention is more preferably 0.5 g/100 mL or less, even more preferably 0.4 g/100 mL or less, still more preferably 0.3 g/100 mL or less, further preferably 0.2 g/100 mL or less, and particularly preferably 0.1 g/100 mL or less. Examples of the dietary fiber include water-soluble dietary fiber. Examples of the water-soluble dietary fiber include indigestible dextrin, polydextrose, guar gum degradation products, pectin, glucomannan, alginic acid, laminarin, fucoidin, and carrageenan. From the viewpoint of versatility, such as stability and safety, indigestible dextrin or polydextrose is preferred.

The content of the dietary fiber may be adjusted within the above range by adding a commercially available product, or may be adjusted in the production process so that the content of dietary fiber derived from a raw material such as malt falls within the above range. In the case where a commercially available product is added, the powderiness unsuitable for beer-taste beverages can be suppressed by adjusting the content of dietary fiber within the above-described range. In the case where the content of dietary fiber is adjusted in the production process, the content of dietary fiber is adjusted within the above range, and thus, for example, the filterability in wort filtration and beer filtration can be improved, and the production efficiencies can be increased.

When the content of dietary fiber is adjusted in the production process, the content of dietary fiber in the beer-taste beverage according to one embodiment of the present invention can be adjusted by adjusting the addition of dilution water or carbonated water, the types and amounts of raw materials (wheat, malt, corn, sugar solution, and the like), the type and amount of enzyme, the timing for addition of enzyme (during a saccharification step, before addition of yeast, after addition of yeast, during aging, or the like), and the set temperature, pH, and retention time of each temperature region in preparation of a saccharified liquid.

In the beer-taste beverage, the bitterness is preferably imparted by hop or the like, but a bittering agent or a bitterness imparting agent may be further used.

The bittering agent or bitterness imparting agent is not particularly limited, and a substance used as a bitterness imparting agent in ordinary beer and low-malt beer can be used. Examples include rosemary, litchi, caraway, juniper berry, sage, rosemary, reishi mushroom, bay laurel, reishi mushroom, quassin, citrus extract, bitter wood extract, coffee extract, tea extract, bitter gourd extract, lotus embryo extract, Aloe arborescens extract, rosemary extract, litchi extract, laurel extract, sage extract, caraway extract, wormwood extract, absinthin, and alginic acid.

The antioxidant is not particularly limited, and a substance used as an antioxidant in ordinary beer and low-malt beer can be used, and examples include ascorbic acid, erythorbic acid, and catechin.

The flavoring is not particularly limited, and a general beer flavoring can be used. The beer flavoring is used for giving a beer-like flavor, and includes, for example, a brewing component generated by fermentation.

The beer-taste beverage contains ethyl acetate produced by alcoholic fermentation, and the ethyl acetate functions as a flavoring. Therefore, when the production process for the beer-taste beverage involves alcoholic fermentation, it is less necessary to separately add a beer flavoring, but a beer flavoring may be added as desired.

Examples of the beer flavoring other than ethyl acetate include esters and higher alcohols, specifically including isoamyl acetate, ethyl acetate, n-propanol, isobutanol, acetaldehyde, ethyl caproate, ethyl caprylate, isoamyl propionate, linalool, geraniol, citral, 4-vinylguaiacol (4-VG), 4-methyl-3-pentenoic acid, 2-methyl-2-pentenoic acid, 1,4-cineol, 1,8-cineol, 2, 3-diethyl-5-methylpyrazine, γ-decanolactone, γ-undecalactone, ethyl hexanoate, ethyl 2-methylbutyrate, ethyl n-butyrate, myrcene, citral, limonene, maltol, ethyl maltol, phenylacetic acid, furaneol, furfural, methional, 3-methyl-2-butene-1-thiol, 3-methyl-2-butanethiol, diacetyl, ferulic acid, geranic acid, geranyl acetate, ethyl butyrate, octanoic acid, decanoic acid, 9-decenoic acid, nonanoic acid, tetradecanoic acid, propanoic acid, 2-methylpropanoic acid, Y-butyrolactone. 2-aminoacetophenone, ethyl 3-phenylpropionate, 2-ethyl-4-hydroxy-5-methyl-3 (2H)-furanone, dimethylsulfone, 3-methylcyclopentane-1,2-dione, 2-methylbutanal, 3-methylbutanal, 2-methyltetrahydrofuran-3-one, 2-acetylfuran, 2-methyltetrahydrofuran-3-one, hexanal, hexanol, cis-3-hexenal, 1-octen-3-ol, β-eudesmol, 4-mercapto-4-methylpentan-2-one, β-caryophyllene, β-myrcene, furfuryl alcohol. 2-ethylpyrazine, 2,3-dimethylpyrazine, 2-methylbutyl acetate, isoamyl alcohol. 5-hydroxymethylfurfural, phenylacetaldehyde, 1-phenyl-3-buten-1-one, trans-2-hexenal, nonanal, and phenethyl alcohol. One of these flavorings may be used alone, or two or more of these flavorings may be used in combination.

The acidulant is not particularly limited as long as it is a substance with a sour taste, and examples include phosphoric acid, citric acid, gluconic acid, tartaric acid, lactic acid, malic acid, phytic acid, acetic acid, succinic acid, glucono-delta-lactone, and salts thereof.

Among these acidulants, phosphoric acid, citric acid, gluconic acid, tartaric acid, lactic acid, malic acid, phytic acid, acetic acid, succinic acid or salts thereof are preferable, malic acid, phosphoric acid, citric acid, lactic acid, tartaric acid, acetic acid, or salts thereof are more preferable, and malic acid, citric acid, phosphoric acid, lactic acid or salts thereof are particularly preferable. One of these acidulants may be used alone, or two or more of these acidulants may be used in combination.

The amount of the acidulant blended is preferably from 50 to 2000 ppm by mass, more preferably from 100 to 1800 ppm by mass, and even more preferably from 200 to 1500 ppm by mass.

In the beer-taste beverage according to one embodiment of the present invention, a content of malic acid is not particularly limited, and is preferably 20 ppm by mass or more, 30 ppm by mass or more, 40 ppm by mass or more, 50 ppm by mass or more, 60 ppm by mass or more, 70 ppm by mass or more, 80 ppm by mass or more, 90 ppm by mass or more, 100 ppm by mass or more, 150 ppm by mass or more, or 200 ppm by mass or more from the viewpoint of enhancing the delicious taste of barley/wheat suitable for beer-taste beverages. In addition, from the viewpoint of providing a beverage that does not have an excessively strong sourness, the content of malic acid is preferably 600 ppm by mass or less, 550 ppm by mass or less, 500 ppm by mass or less, or 450 ppm by mass or less.

As the malic acid, synthetic malic acid may be used, fermented malic acid may be used, or synthetic malic acid and fermented malic acid may be used in combination. The content of malic acid can be measured by a high-performance liquid chromatography (HPLC) method.

In the beer-taste beverage according to one embodiment of the present invention, a content of citric acid is not particularly limited, and is preferably 20 ppm by mass or more, 30 ppm by mass or more, 40 ppm by mass or more, 50 ppm by mass or more, 60 ppm by mass or more, 70 ppm by mass or more, 80 ppm by mass or more, 90 ppm by mass or more, 100 ppm by mass or more, 150 ppm by mass or more. 200 ppm by mass or more, or 250 ppm by mass or more, from the viewpoint of enhancing the delicious taste of barley/wheat suitable for beer-taste beverages. In addition, from the viewpoint of providing a beverage that does not have an excessively strong sourness, the content of citric acid is preferably 600 ppm by mass or less, 550 ppm by mass or less, 500 ppm by mass or less, or 450 ppm by mass or less.

The content of citric acid can be measured by a high-performance liquid chromatography (HPLC) method.

In the beer-taste beverage according to one embodiment of the present invention, a content of lactic acid is not particularly limited, and is preferably 20 ppm by mass or more, 30 ppm by mass or more, 40 ppm by mass or more, 50 ppm by mass or more, 60 ppm by mass or more, 70 ppm by mass or more, 80 ppm by mass or more, 90 ppm by mass or more. 100 ppm by mass or more, 150 ppm by mass or more, 200 ppm by mass or more, 250 ppm by mass or more. 300 ppm by mass or more, 350 ppm by mass or more, or 400 ppm by mass or more, from the viewpoint of imparting of mellowness suitable for beer-taste beverages. In addition, from the viewpoint of providing a beverage that does not have an excessively strong sourness, the content of lactic acid is preferably 600 ppm by mass or less, 550 ppm by mass or less, 500 ppm by mass or less, or 450 ppm by mass or less.

As the lactic acid, synthetic lactic acid may be used, fermented lactic acid may be used, or synthetic lactic acid and fermented lactic acid may be used in combination. The content of lactic acid can be measured by a high-performance liquid chromatography (HPLC) method.

In the beer-taste beverage according to one embodiment of the present invention, a content of phosphoric acid is not particularly limited, and is preferably 50 ppm by mass or more, 75 ppm by mass or more, 100 ppm by mass or more, 125 ppm by mass or more, 150 ppm by mass or more, 200 ppm by mass or more, 250 ppm by mass or more. 300 ppm by mass or more, 350 ppm by mass or more, 400 ppm by mass or more, or 450 ppm by mass or more, from the viewpoint of imparting a sharp taste suitable for beer-taste beverages. In addition, from the viewpoint of providing a beverage that does not have an excessively strong sourness, the content of phosphoric acid is preferably 1000 ppm by mass or less, 950 ppm by mass or less. 900 ppm by mass or less, or 850 ppm by mass or less.

The content of phosphoric acid can be measured by a high-performance liquid chromatography (HPLC) method.

Examples of a preservative include benzoic acid; benzoate salts, such as sodium benzoate; benzoate esters, such as propyl parahydroxybenzoate and butyl parahydroxybenzoate; and dimethyl dicarbonate. In addition, for the preservative, a commercially available preparation, such as Kyohryoku Sanpurezah (Powerful Sanplezer) (a mixture of sodium benzoate and butyl benzoate, available from San-Ei Gen F.F.I., Inc.) may be used. One of these preservatives may be used alone, or two or more of these preservatives may be used in combination.

The amount of the preservative blended is preferably from 5 to 1200 ppm by mass, more preferably from 10 to 1100 ppm by mass, even more preferably from 15 to 1000 ppm by mass, and still more preferably from 20 to 900 ppm by mass.

Examples of the salt include sodium chloride, potassium acid phosphate, calcium acid phosphate, ammonium phosphate, magnesium sulfate, calcium sulfate, potassium metabisulfite, calcium chloride, magnesium chloride, potassium nitrate, ammonium sulfate, potassium chloride, monosodium citrate, disodium citrate, and trisodium citrate.

One of these salts may be used alone, or two or more of these salts may be used in combination.

1.2 Carbonic Acid Gas

Carbonic acid gas contained in the beer-taste beverage according to one embodiment of the present invention may be carbonic acid gas contained in the raw material, or may be dissolved by mixing with carbonated water, addition of carbonic acid gas, or the like.

Since the beer-taste beverage according to one embodiment of the present invention is produced through alcoholic fermentation, the carbonic acid gas generated in the fermentation step can be used as it is. However, the amount of the carbonic acid gas may be adjusted by appropriately adding carbonated water.

A carbonic acid gas concentration of the beer-taste beverage according to one embodiment of the present invention is preferably 0.30 (w/w) % or more, more preferably 0.35 (w/w) % or more, even more preferably 0.40 (w/w) % or more, still more preferably 0.42 (w/w) % or more, and particularly preferably 0.45 (w/w) % or more, and preferably 0.80 (w/w) % or less, more preferably 0.70 (w/w) % or less, even more preferably 0.60 (w/w) % or less, still more preferably 0.57 (w/w) or less, and particularly preferably 0.55 (w/w) % or less.

In the present specification, the carbonic acid gas concentration can be measured by immersing a container containing a target beverage in a water bath at 20° C. for 30 minutes or longer with occasional shaking of the container to adjust the beverage to 20° C. and then using a gas volume measuring device (e.g., such as GVA-500 (available from Kyoto Electronics Manufacturing Co., Ltd.)).

In the case where the beer-taste beverage according to one embodiment of the present invention is a packaged beverage, a carbonic acid gas pressure of the packaged beverage may be appropriately adjusted such that the carbonic acid gas concentration is in the range described above, and is 5.0 kg/cm$^2$ or less, 4.5 kg/cm$^2$ or less, or 4.0 kg/cm$^2$ or less, and 0.20 kg/cm$^2$ or more. 0.50 kg/cm$^2$ or more, or 1.0 kg/cm$^2$ or more. Any of these upper and lower limits may be combined. For example, the carbonic acid gas pressure of the beverage may be 0.20 kg/cm$^2$ or more and 5.0 kg/cm$^2$ or less, 0.50 kg/cm$^2$ or more and 4.5 kg/cm$^2$ or less, or 1.0 kg/cm$^2$ or more and 4.0 kg/cm$^2$ or less.

In the present specification, the gas pressure refers to the gas pressure in the container except in special cases.

The pressure can be measured by a method well-known to those skilled in the art, for example, using a method in which a sample adjusted to 20° C. is fixed to a gas internal pressure meter, the stopcock of the gas internal pressure meter is opened once to release the gas, the stopcock is closed again, the gas internal pressure meter is shaken, and a value when the pointer reaches a certain position is read; or using a commercially available gas pressure measuring device.

1.3 Additional Additive

To the beer-taste beverage according to one embodiment of the present invention, various additives may be added as necessary to the extent that the effects of the present invention are not hindered.

Examples of such an additive include colorants; foam-forming agents; fermentation promoters; yeast extract; protein-based substances, such as peptide-containing substances; and seasonings, such as amino acids.

The colorant is used to impart a beer-like color to the beverage, and a caramel dye can be used, for example. The foam-forming agent is used to form beer-like foam in the beverage or to keep the foam of the beverage, and a plant-extracted saponin-based substance, such as soybean saponin or quillaja saponin: a plant protein, such as corn or soybean; and a peptide-containing substance, such as a collagen peptide; a yeast extract; a raw material originating from milk; and/or the like can be appropriately used.

The fermentation promoter is used to promote fermentation by yeast. For example, a yeast extract; a bran component, such as rice or wheat bran; a vitamin; a mineral agent; and/or the like can be used alone or in combination.

1.4 Packaged Beverage

The beer-taste beverage according to an embodiment of the present invention may be a packaged beverage packaged in a container. For the packaged beverage, a container of any form and material may be used, and examples of the container include a bottle, a can, a barrel, and a PET bottle. In particular, from the viewpoint of ease of carrying, the container is preferably a can, a bottle, or a PET bottle.

2. Method for Producing Beer-Taste Beverage

A method for producing a beer-taste beverage according to an embodiment of the present invention will be described separately for a fermented beer-taste beverage and a non-fermented beer-taste beverage.

2.1 Method for Producing Fermented Beer-Taste Beverage

When the beer-taste beverage according to one embodiment of the present invention is a fermented beer-taste beverage, the method for producing the fermented beer-taste beverage according to one embodiment of the present invention preferably includes adding yeast to a raw material including water and malt and performing alcoholic fermentation. More specifically, the method preferably includes the following steps (1) to (3):

(1) performing at least one treatment of saccharification treatment, boiling treatment, or solid content removal treatment on a raw material to produce a pre-fermentation liquid;

(2) cooling the pre-fermentation liquid obtained in step (1) to obtain a cooled pre-fermentation liquid; and (3) adding yeast to the cooled pre-fermentation liquid obtained in step (2) to perform alcoholic fermentation.

In addition to the steps (1) to (3), the production method according to an embodiment of the present invention may include checking and/or adjusting the real extract value, the pyroglutamic acid content, and the linalool content. This step will be described later as step (4).

Step (1)

Step (1) is a step of performing at least one treatment among saccharification treatment, boiling treatment, and solid content removal treatment using various raw materials to obtain a pre-fermentation liquid.

For example, in the case of using malt as a raw material, various raw materials including water and malt are fed in a preparation tank or a preparation tank, and an enzymatic agent, such as a polysaccharide degrading enzyme or a proteolytic enzyme, which promotes a change of a component derived from the raw material may be added as necessary before fermentation.

Examples of the enzymatic agent include amylases, proteases, purine nucleosidases, deaminases, polyphenoloxidases, glucanases, xylanases, pectinases, cellulases, lipases, glucosidases, xanthine oxidases, transglucosidases, glucoamylases, polyphenoloxidases, and uricases. In addition, examples include enzymatic agents falling under "(3) Following Enzymatic Agents Added During Brewing Step for Purpose of Rationalization of Brewing and the like" in Article 3 "7. Articles Not Handled as Raw Materials for Alcoholic Beverages" of the Notice on the Liquor Tax Law and the Administrative Ordinance Related to Alcoholic Beverages (revised on Jun. 27, 2018).

Adding these enzymatic agents can efficiently adjust the component composition of the resulting beer-taste beverage. Hops, a preservative, a sweetener, a water-soluble dietary fiber, a bittering agent or bitterness imparting agent, an antioxidant, a flavoring, an acidulant, a salt, and/or the like may be added as various raw materials other than malt. These raw materials may be added before performing the saccharification treatment, during the saccharification treatment, or after completion of the saccharification treatment. In addition, these raw materials may be added during or after the alcoholic fermentation in the next step.

A mixture of the various raw materials is heated to saccharify the starch of the raw materials to perform saccharification treatment.

The temperature and time of the saccharification treatment are preferably appropriately adjusted in view of the type of malt used, the malt ratio, the raw materials other than water and malt, the type and amount of the enzyme used, the original extract concentration of the beverage finally obtained, and the like. For example, in an embodiment of the present invention, the temperature of the saccharification treatment is preferably from 55 to 75° C., and the time of the saccharification treatment is preferably from 15 to 240 minutes, from the viewpoint of adjusting an apparent attenuation of the beer-taste beverage within the above range. After the saccharification treatment, filtration is performed, and a saccharified liquid is obtained.

The saccharified liquid is preferably subjected to boiling treatment.

When this boiling treatment is performed, hops, a bittering agent, and the like are preferably added in the case of using them as raw materials. Hops, a bittering agent, and/or the like may be added between the start of boiling the saccharified liquid and before the completion of the boiling.

Instead of the saccharified liquid, a pre-fermentation liquid may be prepared by adding hops, a bittering agent, and/or the like to a mixture obtained by adding warm water to a malt extract, and boiling the mixture.

In addition, in the case without using malt, a pre-fermentation liquid may be prepared by mixing, as the raw materials, a liquid sugar containing a carbon source: a nitrogen source as an amino acid-containing raw material other than barley and the like or malt; hops: a preservative; a sweetener; a water-soluble dietary fiber; a bittering agent or a bitterness imparting agent; an antioxidant; a flavoring: an acidulant; a salt; and/or the like together with warm water to prepare a liquid sugar solution, and boiling the liquid sugar solution.

In the case of using hops, it may be added before the boiling treatment or may be added between the start of boiling the liquid sugar solution and before the completion of the boiling.

Step (2)

Step (2) is a step of cooling the pre-fermentation liquid produced in step (1) to obtain a cooled pre-fermentation liquid.

After the completion of the boiling treatment, the pre-fermentation liquid is transferred to a whirlpool and cooled to from 0 to 23° C. After the cooling, solid contents, such as coagulated protein, may be removed to adjust the original extract concentration.

Through such treatment, a cooled pre-fermentation liquid is obtained.

Step (3)

Step (3) is a step of adding yeast to the cooled pre-fermentation liquid produced in step (2) to perform alcoholic fermentation.

The yeast used in this step can be appropriately selected in view of the type of the fermented beverage produced, the target flavor, the fermentation conditions, and the like, and top-fermenting yeast may be used, or bottom-fermenting yeast may be used.

The yeast in the form of a yeast suspension as is may be added to raw materials, or a slurry produced by concentrating the yeast by centrifugation or sedimentation may be added to the pre-fermentation liquid. Alternatively, a material obtained by completely removing the supernatant after the centrifugation may be added. The amount of yeast added to a stock solution can be appropriately set and is, for example, appropriately from $5\times10^6$ cells/mL to $1\times10^8$ cells/mL.

Various conditions, such as the fermentation temperature and the fermentation period, for performing alcoholic fermentation can be appropriately set, and fermentation is preferably performed, for example, under conditions of from 8 to 25° C. for from 5 to 10 days. During the fermentation step, the temperature (temperature increase or temperature decrease) or pressure of the fermented liquid may be changed.

In addition, after completion of this step, the yeast may be removed with a filter or the like, and water or an additive, such as a flavoring, an acidulant, or a dye, may be added as necessary.

Step (4)

Step (4) is a step of checking and/or adjusting the real extract value, the pyroglutamic acid content, and the linalool content.

These contents and the like can also be adjusted by appropriately setting, for example, the variety of raw material, the blending amount thereof, the preparation conditions (for example, timing for addition of the raw material), the variety of yeast, the fermentation conditions and the like in the steps (1) and (2). Therefore, in the step (4), it is preferable to measure the contents and the like and to confirm whether or not they fall within the above-mentioned ranges. When a component of these components falls outside the range, it is preferable to perform adjustment by adding the component falling outside the range or adjustment by dilution.

The adjustment of the content or the like of each component in this step may be performed in parallel with the step (1), the step (2) and/or the step (3), may be performed between the step (1) and the step (2), may be performed between the step (2) and the step (3), or may be performed after the step (3). In addition, checking the content or the like of each component in this step may be performed at any timing described above, and it is preferable to check the content or the like of each component after the step (3), and, as a result, if there is a component requiring adjustment, to adjust the content or the like of the component.

After these steps, a step performed in the production of a beer-taste beverage known to those skilled in the art, such as a step of storing an alcoholic beverage and a filtration step, may be performed.

The beer-taste beverage thus produced is filled in a predetermined container and distributed to the market as a product.

The method of packaging the beer-taste beverage is not particularly limited, and a packaging method known to those skilled in the art can be used. Through the packaging, the beer-taste beverage is filled and sealed in a container. In the packaging, a container of any form and material may be used, and examples of the container are as described above.

2.2 Method for Producing Non-Fermented Beer-Taste Beverage

When the fermented beer-taste beverage according to one embodiment of the present invention is a non-fermented beer-taste beverage, it can be produced by a general method for producing a non-fermented beer-taste beverage. Specific examples of the method for producing a non-fermented beer-taste beverage according to one embodiment of the present invention include a method including the following steps (a) to (c):

(a): performing at least one treatment of preparation treatment (mixing treatment of various raw materials), alcohol raw material addition treatment, saccharification treatment, boiling treatment, and solid content removal treatment using various raw materials to obtain a primary raw material liquid;

(b): sterilizing and diluting the primary raw material liquid as necessary, and adding carbonic acid gas by carbonation treatment; and (c): checking and/or adjusting the real extract value, the pyroglutamic acid content and the linalool content.

If necessary, the precipitate can be separated and removed by filtration, centrifugation or the like at each stage. In these steps, a normal production process for a soft drink can be used to simply produce a non-fermented beer-taste beverage without using a fermentation facility.

As a specific method for producing the primary raw material liquid by the step (a), the same method as the above-mentioned step (1) is indicated.

In the case of producing a non-fermented alcohol-containing beer-taste beverage, an alcoholic beverage may be added as an alcohol raw material to prepare an alcohol-containing primary raw material liquid. The alcoholic beverage added is not particularly limited, and examples thereof include raw material alcohols, shochu, Awamori, whisky, brandy, and spirits such as vodka, rum, tequila, and gin.

By the carbonation treatment in the step (b), carbonic acid gas can be added to the primary raw material liquid or the alcohol-containing primary raw material liquid to obtain a carbonated beverage.

A method for adding carbonic acid gas may be a method in which carbonic acid gas is directly added to the primary raw material liquid or the alcohol-containing primary raw material liquid, or a method in which these raw material liquids are prepared in concentrated states and then carbonic acid gas is added by mixing of the liquids with carbonated water. When carbonic acid gas is added, an additive, such as a preservative, a sweetener, a flavoring, an acidulant, and/or a dye may be added as necessary.

In addition, it is preferable to perform treatment for removing precipitates before the carbonation step in order to remove substances causing lees and miscellaneous tastes. The sterilization step and the dilution step may be performed before the carbonation treatment, may be performed after the container is filled, or may be performed in both the steps.

Then, as in the step (3), it is preferable to undergo the step of checking and/or adjusting the real extract value, the pyroglutamic acid content, and the linalool content as the step (c).

The step (c) may be carried out between the step (a) and the step (b) or after the step (a) and the step (b). The step (c) may be carried out in parallel with the step (a) and/or the step (b).

The non-fermented beer-taste beverage according to one embodiment of the present invention thus produced is filled in a predetermined container and distributed to the market as a product.

As a packaging method, the same method as that described for the method for producing a fermented beer-taste beverage can be used.

EXAMPLES

Hereinafter, the present invention will be described in more detail by examples and the like, but the present invention is not limited by these examples.

In addition, in the examples, the real extract value was measured, for example, by a method described in Revised BCOJ Beer Analysis Method (published by Public Interest Incorporated Foundation, The Brewing Society of Japan, edited by [Analysis Committee] Brewery Convention of Japan, Brewers Association of Japan, Enlarged and Revised Edition of 2013).

Examples 1 to 50, Comparative Examples 1 to 14, and Reference Examples 1 to 5

Preparation of Beverage

Crushed barley malt was fed in a preparation tank containing 120 L of warm water, then the temperature was raised stepwise and retained, and filtration was performed to remove malt cake and the like. After filtration, the raw material liquid and hops were charged into a boiling pot and adjusted to a 100 L with warm water to obtain hot wort.

The obtained hot wort was cooled and aerated with oxygen to obtain 60 L of a pre-fermentation liquid before addition of yeast.

Brewer's yeast (bottom-fermenting yeast) was added to the pre-fermentation liquid thus obtained, and the mixture was fermented for about one week. After a further aging period of about one week, the yeast was removed by filtration, and extract-conditioned water was added to prepare a beer-taste beverage. In all Examples and Comparative Examples, the content of dietary fiber was 0.4 g/100 mL or less.

In each of Examples and Comparative Examples, the amounts and types of raw materials such as malt, liquid sugar and hop, mashing pattern, types of enzymatic agents such as proteolytic enzyme, added amount thereof, addition timing and, if necessary, deactivation treatment of enzyme activity, set temperature in each temperature region during wort preparation, retention time, pH adjustment, turbidity during wort filtration, hop addition timing, boiling time, fermentation conditions and the like were set as appropriate to achieve the malt ratios, real extract values, pyroglutamic acid contents, linalool contents and carbohydrate contents listed in Tables 3 to 9. Table 1 lists the results obtained by evaluating in advance the quaffability suitable for beer-taste beverages depending on the difference in real extract value. In addition, Table 2 lists the results obtained by evaluating in advance the full bodied taste typical of beer-taste beverages depending on the difference in content of pyroglutamic acid.

The content of each component listed in the following tables is a value in consideration of rounding off, and the content proportion of each component is calculated based on the content of each component without consideration of rounding off, and indicates a value rounded off to the first decimal place.

Sensory Evaluation

The obtained beer-taste beverages were evaluated as follows by the same six panelists tasting each beverage.

Each panelist tasted 350 mL of each beer-taste beverage cooled to about 4° C., and evaluated the evaluation items of "suitable full bodied taste typical of beer-taste beverages", "suitable refreshing aftertaste typical of beer-taste beverages", and "sweet aroma unsuitable for beer-taste beverages" with scores in increments of 0.1 in the range of from 3.0 (maximum) to 1.0 (minimum) based on the following score criteria. The average values of the scores of the six panelists were calculated. In Table 1, the evaluation item of "quaffability suitable for beer-taste beverages" was similarly evaluated. In Table 2, only the "suitable full bodied taste typical of beer-taste beverages" was evaluated.

In the evaluation, samples falling in the following criteria "1.0", "2.0", or "3.0" for each of the evaluation items were prepared in advance to standardize the criteria among the panelists. Also in sensory evaluation of all Examples and Comparative Examples, for the same beverage, no difference in a score value of 2.0 or more was observed between panelists.

[Suitable Full Bodied Taste Typical of Beer-Taste Beverages]

"3.0": The full bodied taste typical of beer-taste beverages is very strongly perceived.

"2.5": The full bodied taste typical of beer-taste beverages is strongly perceived.

"2.0": The full bodied taste typical of beer-taste beverages is perceived.

"1.5": The full bodied taste typical of beer-taste beverages is not perceived so much.

"1.0": The full bodied taste typical of beer-taste beverages is hardly perceived.

[Suitable Refreshing Aftertaste Typical of Beer-Taste Beverages]

"3.0": The refreshing aftertaste typical of beer-taste beverages is very strongly perceived.

"2.5": The refreshing aftertaste typical of beer-taste beverages is strongly perceived.

"2.0": The refreshing aftertaste typical of beer-taste beverages is perceived.

"1.5": The refreshing aftertaste typical of beer-taste beverages is not perceived so much.

"1.0": The refreshing aftertaste typical of beer-taste beverages is hardly perceived.

[Sweet Aroma Unsuitable for Beer-Taste Beverages]

"3.0": No sweet aroma unsuitable for beer-taste beverages is perceived at all.

"2.5": Sweet aroma unsuitable for beer-taste beverages is hardly perceived.

"2.0": Sweet aroma unsuitable for beer-taste beverages is not perceived so much.

"1.5": Sweet aroma unsuitable for beer-taste beverages is perceived.

"1.0": Sweet aroma unsuitable for beer-taste beverages is strongly perceived.

[Quaffability Suitable for Beer-Taste Beverages]

"3.0": The quaffability suitable for beer-taste beverages is very strongly perceived.

"2.5": The quaffability suitable for beer-taste beverages is strongly perceived.

"2.0": The quaffability suitable for beer-taste beverages is perceived.

"1.5": The quaffability suitable for beer-taste beverages is not perceived so much.

"1.0": The quaffability suitable for beer-taste beverages is hardly perceived.

In Tables 3 to 9, overall evaluation was performed based on the three evaluation items according to the following criteria.

Overall Evaluation

"A": All of the average scores of the three verified sensory evaluation items are 2.2 or higher.

"B": Not falling in "A" or "C".

"C": One or more of the average scores of the three verified sensory evaluation items is lower than 2.0.

TABLE 1

| | Unit | Reference Example 1 | Reference Example 2 | Reference Example 3 |
|---|---|---|---|---|
| Real extract | mass % | 1.88 | 0.57 | 2.50 |
| Carbohydrate | g/100 mL | 1.4 | 0.5 | 2.0 |
| Quaffability typical of beer-taste beverages | | 2.1 | 2.8 | 1.7 |

TABLE 2

| | Unit | Reference Example 4 | Reference Example 5 |
|---|---|---|---|
| Pyroglutamic acid | mg/L | 29.4 | 11.0 |
| Full bodied taste typical of beer-taste beverages | | 2.0 | 1.4 |

TABLE 3

| | Unit | Example 1 | Example 2 | Example 3 | Example 4 | Example 5 | Example 6 | Example 7 |
|---|---|---|---|---|---|---|---|---|
| Malt ratio | mass % | 50 | 50 | 50 | 50 | 50 | 50 | 50 |
| Real extract | mass % | 0.57 | 0.61 | 0.77 | 0.81 | 0.84 | 0.93 | 1.04 |
| Carbohydrate | g/100 mL | 0.5 | 0.5 | 0.5 | 0.5 | 1.2 | 0.8 | 0.5 |
| Linalool | ppb by mass | 29.1 | 16.2 | 11.1 | 21.8 | 22.1 | 25.9 | 29.0 |
| Pyroglutamic acid | mg/L | 77 | 29 | 33 | 77 | 137 | 77 | 77 |
| Pyroglutamic acid/linalool | | 2.7 | 1.8 | 2.9 | 3.6 | 6.2 | 3.0 | 2.7 |
| Pyroglutamic acid/carbohydrate | | 154.9 | 58.8 | 65.4 | 154.9 | 113.9 | 96.8 | 154.9 |
| Linalool/carbohydrate | | 58.2 | 32.4 | 22.2 | 43.6 | 18.4 | 32.4 | 58.0 |
| Suitable full bodied taste typical of beer-taste beverages | | 2.2 | 2.0 | 2.0 | 2.2 | 2.5 | 2.2 | 2.2 |
| Suitable refreshing aftertaste typical of beer-taste beverages | | 2.2 | 2.1 | 2.0 | 2.2 | 2.2 | 2.2 | 2.2 |
| Sweet aroma unsuitable for beer-taste beverages | | 2.7 | 2.8 | 2.9 | 2.8 | 2.8 | 2.7 | 2.7 |
| Overall evaluation | | A | B | B | A | A | A | A |

| | Unit | Example 8 | Example 9 | Example 10 | Example 11 | Example 12 | Example 13 |
|---|---|---|---|---|---|---|---|
| Malt ratio | mass % | 50 | 50 | 50 | 50 | 50 | 50 |
| Real extract | mass % | 1.12 | 1.31 | 1.64 | 1.84 | 1.88 | 1.98 |
| Carbohydrate | g/100 mL | 0.8 | 0.8 | 1.5 | 1.5 | 1.4 | 1.5 |
| Linalool | ppb by mass | 19.9 | 19.2 | 21.2 | 15.2 | 28.0 | 25.5 |

TABLE 3-continued

| | | | | | | | |
|---|---|---|---|---|---|---|---|
| Pyroglutamic acid | mg/L | 78 | 77 | 77 | 77 | 137 | 77 |
| Pyroglutamic acid/ linalool | | 3.9 | 4.0 | 3.7 | 5.1 | 4.9 | 3.0 |
| Pyroglutamic acid/ carbohydrate | | 97.0 | 96.8 | 51.6 | 51.6 | 97.6 | 51.6 |
| Linalool/carbohydrate | | 24.9 | 24.0 | 14.1 | 10.1 | 20.0 | 17.0 |
| Suitable full bodied taste typical of beer-taste beverages | | 2.2 | 2.2 | 2.2 | 2.2 | 2.5 | 2.2 |
| Suitable refreshing aftertaste typical of beer-taste beverages | | 2.1 | 2.1 | 2.1 | 2.1 | 2.2 | 2.2 |
| Sweet aroma unsuitable for beer-taste beverages | | 2.8 | 2.8 | 2.8 | 2.8 | 2.7 | 2.7 |
| Overall evaluation | | B | B | B | B | A | A |

TABLE 4

| | Unit | Example 14 | Example 15 | Example 16 | Example 17 | Example 18 | Example 19 | Example 20 | Example 21 |
|---|---|---|---|---|---|---|---|---|---|
| Malt ratio | mass % | 67 | 67 | 66 | 67 | 66 | 67 | 66 | 66 |
| Real extract | mass % | 0.61 | 0.81 | 1.04 | 1.12 | 1.31 | 1.84 | 1.88 | 1.98 |
| Carbohydrate | g/100 mL | 0.5 | 0.5 | 0.5 | 0.8 | 0.8 | 1.5 | 1.4 | 1.5 |
| Linalool | ppb by mass | 16.5 | 16.5 | 21.1 | 14.5 | 21.2 | 13.0 | 19.1 | 14.5 |
| Pyroglutamic acid | mg/L | 39 | 104 | 104 | 104 | 104 | 104 | 183 | 104 |
| Pyroglutamic acid/ linalool | | 2.4 | 6.3 | 4.9 | 7.2 | 4.9 | 8.0 | 9.6 | 7.2 |
| Pyroglutamic acid/ carbohydrate | | 78.9 | 207.5 | 207.5 | 130.0 | 129.7 | 69.2 | 130.8 | 69.2 |
| Linalool/carbohydrate | | 33.0 | 33.0 | 42.2 | 18.1 | 26.5 | 8.7 | 13.6 | 9.7 |
| Suitable full bodied taste typical of beer-taste beverages | | 2.0 | 2.4 | 2.4 | 2.4 | 2.4 | 2.4 | 2.7 | 2.4 |
| Suitable refreshing aftertaste of typical beer-taste beverages | | 2.1 | 2.1 | 2.1 | 2.1 | 2.1 | 2.0 | 2.1 | 2.1 |
| Sweet aroma unsuitable for beer-taste beverages | | 2.8 | 2.8 | 2.8 | 2.9 | 2.8 | 2.9 | 2.8 | 2.9 |
| Overall evaluation | | B | B | B | B | B | B | B | B |

TABLE 5

| | Unit | Example 22 | Example 23 | Example 24 | Example 25 | Example 26 | Example 27 | Example 28 | Example 29 |
|---|---|---|---|---|---|---|---|---|---|
| Malt ratio | mass % | 80 | 80 | 80 | 80 | 80 | 80 | 80 | 80 |
| Real extract | mass % | 0.61 | 0.81 | 1.04 | 1.12 | 1.31 | 1.84 | 1.88 | 1.98 |
| Carbohydrate | g/100 mL | 0.5 | 0.5 | 0.5 | 0.8 | 0.8 | 1.5 | 1.4 | 1.5 |
| Linalool | ppb by mass | 18.0 | 22.5 | 33.5 | 25.2 | 33.9 | 20.2 | 33.8 | 31.7 |
| Pyroglutamic acid | mg/L | 47 | 124 | 124 | 124 | 124 | 124 | 219 | 124 |
| Pyroglutamic acid/ linalool | | 2.6 | 5.5 | 3.7 | 4.9 | 3.7 | 6.1 | 6.5 | 3.9 |
| Pyroglutamic acid/ carbohydrate | | 94.2 | 247.8 | 247.8 | 155.2 | 154.9 | 82.6 | 156.2 | 82.6 |
| Linalool/carbohydrate | | 36.0 | 45.0 | 67.0 | 31.5 | 42.4 | 13.5 | 24.1 | 21.1 |
| Suitable full bodied taste typical of beer-taste beverages | | 2.1 | 2.4 | 2.4 | 2.4 | 2.4 | 2.4 | 2.9 | 2.4 |
| Suitable refreshing aftertaste typical of beer-taste beverages | | 2.1 | 2.2 | 2.3 | 2.2 | 2.3 | 2.1 | 2.3 | 2.3 |
| Sweet aroma unsuitable for beer-taste beverages | | 2.8 | 2.8 | 2.7 | 2.7 | 2.7 | 2.8 | 2.7 | 2.7 |
| Overall evaluation | | B | A | A | A | A | B | A | A |

TABLE 6

| | Unit | Example 30 | Example 31 | Example 32 | Comparative Example 1 | Comparative Example 2 |
|---|---|---|---|---|---|---|
| Malt ratio | mass % | 50 | 50 | 50 | 50 | 50 |
| Real extract | mass % | 0.57 | 0.57 | 0.57 | 0.57 | 0.57 |
| Carbohydrate | g/100 mL | 0.5 | 0.5 | 0.5 | 0.5 | 0.5 |
| Linalool | ppb by mass | 10.2 | 40.5 | 80.5 | 120.1 | 2.2 |
| Pyroglutamic acid | mg/L | 77 | 77 | 77 | 77 | 77 |
| Pyroglutamic acid/ linalool | | 7.6 | 1.9 | 1.0 | 0.6 | 35.2 |
| Pyroglutamic acid/ carbohydrate | | 154.9 | 154.9 | 154.9 | 154.9 | 154.9 |
| Linalool/carbohydrate | | 20.4 | 81.0 | 161.0 | 240.2 | 4.4 |
| Suitable full bodied taste typical of beer-taste beverages | | 2.2 | 2.2 | 2.2 | 2.2 | 2.2 |
| Suitable refreshing aftertaste typical of beer-taste beverages | | 2.0 | 2.4 | 2.9 | 3.4 | 1.3 |
| Sweet aroma unsuitable for beer-taste beverages | | 2.9 | 2.6 | 2.2 | 1.3 | 3.0 |
| Overall evaluation | | B | A | A | C | C |

| | Unit | Example 33 | Example 34 | Example 35 | Comparative Example 3 | Comparative Example 4 |
|---|---|---|---|---|---|---|
| Malt ratio | mass % | 50 | 50 | 50 | 50 | 50 |
| Real extract | mass % | 1.12 | 1.12 | 1.12 | 1.12 | 1.12 |
| Carbohydrate | g/100 mL | 0.8 | 0.8 | 0.8 | 0.8 | 0.8 |
| Linalool | ppb by mass | 10.9 | 412 | 80.6 | 131.2 | 2.1 |
| Pyroglutamic acid | mg/L | 78 | 78 | 78 | 78 | 78 |
| Pyroglutamic acid/ linalool | | 7.1 | 1.9 | 1.0 | 0.6 | 37.0 |
| Pyroglutamic acid/ carbohydrate | | 97.0 | 97.0 | 97.0 | 97.0 | 97.0 |
| Linalool/carbohydrate | | 13.6 | 51.5 | 100.8 | 164.0 | 2.6 |
| Suitable full bodied taste typical of beer-taste beverages | | 2.2 | 2.2 | 2.2 | 2.2 | 2.2 |
| Suitable refreshing aftertaste typical of beer-taste beverages | | 2.0 | 2.4 | 2.9 | 3.6 | 1.2 |
| Sweet aroma unsuitable for beer-taste beverages | | 2.9 | 2.6 | 2.2 | 1.1 | 3.0 |
| Overall evaluation | | B | A | A | C | C |

TABLE 7

| | Unit | Example 36 | Example 37 | Example 38 | Comparative Example 5 | Comparative Example 6 |
|---|---|---|---|---|---|---|
| Malt ratio | mass % | 50 | 50 | 50 | 50 | 50 |
| Real extract | mass % | 1.98 | 1.98 | 1.98 | 1.98 | 1.98 |
| Carbohydrate | g/100 mL | 1.5 | 1.5 | 1.5 | 1.5 | 1.5 |
| Linalool | ppb by mass | 10.2 | 41.1 | 81.8 | 119,7 | 2.2 |
| Pyroglutamic acid | mg/L | 77 | 77 | 77 | 77 | 77 |
| Pyroglutamic acid/ linalool | | 7.6 | 1.9 | 0.9 | 0.6 | 35.2 |
| Pyroglutamic acid/ carbohydrate | | 51.6 | 51.6 | 51.6 | 51.6 | 51.6 |
| Linalool/carbohydrate | | 6.8 | 27.4 | 54.5 | 79.8 | 1.5 |
| Suitable full bodied taste typical of beer-taste beverages | | 2.2 | 2.2 | 2.2 | 2.2 | 2.2 |
| Suitable refreshing aftertaste typical of beer-taste beverages | | 2.0 | 2.4 | 2.9 | 3.4 | 1.3 |
| Sweet aroma unsuitable for beer-taste beverages | | 2.9 | 2.6 | 2.2 | 1.3 | 3.0 |
| Overall evaluation | | B | A | A | C | C |

TABLE 8

| | Unit | Example 39 | Example 40 | Example 41 | Comparative Example 7 | Comparative Example 8 |
|---|---|---|---|---|---|---|
| Malt ratio | mass % | 67 | 67 | 67 | 67 | 67 |
| Real extract | mass % | 1.12 | 1.12 | 1.12 | 1.12 | 1.12 |
| Carbohydrate | g/100 mL | 0.8 | 0.8 | 0.8 | 0.8 | 0.8 |
| Linalool | ppb by mass | 10.0 | 40.0 | 80.0 | 123.0 | 3.1. |
| Pyroglutamic acid | mg/L | 104 | 104 | 104 | 104 | 104 |
| Pyroglutamic acid/linalool | | 10.4 | 2.6 | 1.3 | 0.8 | 33.5 |
| Pyroglutamic acid/carbohydrate | | 130.0 | 130.0 | 130.0 | 130.0 | 130.0 |
| Linalool/carbohydrate | | 12.5 | 50.0 | 100.0 | 153.8 | 3.9 |
| Suitable full bodied taste typical of beer-taste beverages | | 2.4 | 2.4 | 2.4 | 2.4 | 2.4 |
| Suitable refreshing aftertaste typical of beer-taste beverages | | 2.0 | 2.4 | 2.9 | 3.0 | 13 |
| Sweet aroma unsuitable for beer-taste beverages | | 2.9 | 2.6 | 2.2 | 1.3 | 3.0 |
| Overall evaluation | | B | A | A | C | C |

| | Unit | Example 42 | Example 43 | Example 44 | Comparative Example 9 | Comparative Example 10 |
|---|---|---|---|---|---|---|
| Malt ratio | mass % | 66 | 66 | 66 | 66 | 66 |
| Real extract | mass % | 1.98 | 1.98 | 1.98 | 1.98 | 1.98 |
| Carbohydrate | g/100 mL | 1.5 | 1.5 | 1.5 | 1.5 | 1.5 |
| Linalool | ppb by mass | 11.1 | 40.5 | 81.2 | 111.2 | 1.9 |
| Pyroglutamic acid | mg/L | 104 | 104 | 104 | 104 | 104 |
| Pyroglutamic acid/linalool | | 9.3 | 2.6 | 1.3 | 0.9 | 54.6 |
| Pyroglutamic acid/carbohydrate | | 69.2 | 69.2 | 69.2 | 69.2 | 69.2 |
| Linalool/carbohydrate | | 7.4 | 27.0 | 54.1 | 74.1 | 3.3 |
| Suitable full bodied taste typical of beer-taste beverages | | 2.4 | 2.4 | 2.4 | 2.4 | 2.4 |
| Suitable refreshing aftertaste typical of beer-taste beverages | | 2.0 | 2.4 | 2.9 | 3.3 | 1.2 |
| Sweet aroma unsuitable for beer-taste beverages | | 2.9 | .2.6 | 2.2 | 1.5 | 3.0 |
| Overall evaluation | | B | A | A | C | C |

TABLE 9

| | Unit | Example 45 | Example 46 | Example 47 | Comparative Example 11 | Comparative Example 12 |
|---|---|---|---|---|---|---|
| Malt ratio | mass % | 80 | 80 | 80 | 80 | SO |
| Real extract | mass % | 1.12 | 1.12 | 1.12 | 1.12 | 1.12 |
| Carbohydrate | g/100 mL | 0.8 | 0.8 | 0.8 | 0.8 | 0.8 |
| Linalool | ppb by mass | 12.5 | 40.5 | 80.2 | 121.8 | 1.3 |
| Pyroglutamic acid | mg/L | 124 | 124 | 124 | 124 | 124 |
| Pyroglutamic acid/linalool | | 9.9 | 3.1 | 1.5 | 1.0 | 95.5 |
| Pyroglutamic acid/carbohydrate | | 155.2 | 155.2 | 155.2 | 155.2 | 155.2 |
| Linalool/carbohydrate | | 15.6 | 50.6 | 100.3 | 152.3 | 1.6 |
| Suitable full bodied taste typical of beer-taste beverages | | 2.4 | 2.4 | 2.4 | 2.4 | 2.4 |
| Suitable refreshing aftertaste typical of beer-taste beverages | | 2.0 | 2.4 | 2.9 | 3.4 | 3.2 |
| Sweet aroma unsuitable for beer-taste beverages | | 2.9 | 2.6 | 2.2 | 1.3 | 3.0 |
| Overall evaluation | | B | A | A | C | C |

| | Unit | Example 48 | Example 49 | Example 50 | Comparative Example 13 | Comparative Example 14 |
|---|---|---|---|---|---|---|
| Malt ratio | mass % | 80 | 80 | 80 | 80 | 80 |
| Real extract | mass % | 1.98 | 1.98 | 1.98 | 1.98 | 1.98 |
| Carbohydrate | g/100 mL | 1.5 | 1.5 | 1.5 | 1.5 | 1.5 |
| Linalool | ppb by mass | 10.0 | 40.2 | 80.8 | 111.1 | 1.0 |

TABLE 9-continued

| | | | | | | |
|---|---|---|---|---|---|---|
| Pyroglutamic acid | mg/L | 124 | 124 | 124 | 124 | 124 |
| Pyroglutamic acid/linalool | | 12.4 | 3.1 | 1.5 | 1.1 | 123.9 |
| Pyroglutamic acid/carbohydrate | | 82.6 | 82.6 | 82.6 | 82.6 | 82.6 |
| Linalool/carbohydrate | | 6.7 | 26.8 | 53.9 | 74.1 | 0.7 |
| Suitable full bodied taste typical of beer-taste beverages | | 2.4 | 2.4 | 2.4 | 2.4 | 2.4 |
| Suitable refreshing aftertaste typical of beer-taste beverages | | 2.0 | 2.4 | 2.9 | 3.3 | 1.1 |
| Sweet aroma unsuitable for beer-taste beverages | | 2.9 | 2.6 | 22 | 1.5 | 3.0 |
| Overall evaluation | | B | A | A | C | C |

Examples 51 to 65 and Comparative Examples 15 to 17

Preparation of Beverage

Crushed barley malt was fed in a preparation tank containing 120 L of warm water, then the temperature was raised stepwise and retained, and filtration was performed to remove malt cake and the like. After filtration, the raw material liquid and hops were charged into a boiling pot and adjusted to a 100 L with warm water to obtain hot wort.

The obtained hot wort was cooled and aerated with oxygen to obtain 60 L of a pre-fermentation liquid before addition of yeast.

Brewer's yeast (top-fermenting yeast) was added to the pre-fermentation liquid thus obtained, and the mixture was fermented for about one week. After a further aging period of about one week, the yeast was removed by filtration, and extract-conditioned water was added to prepare a beer-taste beverage. In all Examples and Comparative Examples, the content of dietary fiber was 0.4 g/100 mL or less.

In each of Examples and Comparative Examples, the amounts and types of raw materials such as malt and hop, mashing pattern, types of enzymatic agents such as proteolytic enzyme, added amount thereof, addition timing and, if necessary, deactivation treatment of enzyme activity, set temperature in each temperature region during wort preparation, retention time, pH adjustment, turbidity during wort filtration, hop addition timing, boiling time, fermentation conditions and the like were set as appropriate to achieve the malt ratios, real extract values, pyroglutamic acid contents, linalool contents and carbohydrate contents listed in Tables 10 to 11.

The obtained beer-taste beverages were used to perform sensory evaluation in the same manner as in the method in the above section Sensory evaluation. The results are listed in Tables 10 and 11.

The content of each component listed in the following tables is a value in consideration of rounding off, and the content proportion of each component is calculated on the basis of the content of each component without consideration of rounding off, and indicates a value rounded off to the first decimal place.

TABLE 10

| | Unit | Example 51 | Example 52 | Example 53 | Example 54 | Example 55 |
|---|---|---|---|---|---|---|
| Malt ratio | mass % | 100 | 100 | 100 | 100 | 100 |
| Real extract | mass % | 1.05 | 1.33 | 1.36 | 1.38 | 1.41 |
| Carbohydrate | g/100 mL | 0.3 | 0.4 | 0.4 | 0.4 | 0.4 |
| Linalool | ppb by mass | 20.3 | 34.2 | 36.1 | 34.4 | 39.1 |
| Pyroglutamic acid | mg/L | 145 | 183 | 187 | 190 | 194 |
| Pyroglutamic acid/linalool | | 7.1 | 5.4 | 5.2 | 5.5 | 5.0 |
| Pyroglutamic acid/carbohydrate | | 431.8 | 431.8 | 431.8 | 431.8 | 431.8 |
| Linalool/carbohydrate | | 60.6 | 80.6 | 83.5 | 78.2 | 87.2 |
| Suitable full bodied taste typical of beer-taste beverages | | 2.1 | 2.2 | 2.3 | 2.4 | 2.4 |
| Suitable refreshing aftertaste typical of beer-taste beverages | | 2.4 | 2.4 | 2.4 | 2.4 | 2.4 |
| Sweet aroma unsuitable for beer-taste beverages | | 2.7 | 2.7 | 2.7 | 2.7 | 2.7 |
| Overall evaluation | | B | A | A | A | A |

| | Unit | Example 56 | Example 57 | Example 58 | Example 59 | Comparative Example 15 |
|---|---|---|---|---|---|---|
| Malt ratio | mass % | 100 | 100 | 100 | 100 | 100 |
| Real extract | mass % | 2.09 | 2.13 | 2:21 | 2.25 | 2.60 |
| Carbohydrate | g/100 mL | 1.2 | 1.3 | 13 | 13 | 1.5 |
| Linalool | ppb by mass | 37.8 | 38.5 | 40.3 | 43.1 | 52.1 |
| Pyroglutamic acid | mg/L | 189 | 193 | 200 | 203 | 235 |
| Pyroglutamic acid/linalool | | 5.0 | 5.0 | 5.0 | 4.7 | 4.5 |
| Pyroglutamic acid/carbohydrate | | 157.5 | 157.5 | 157.5 | 157.5 | 157.5 |

TABLE 10-continued

| | | | | | |
|---|---|---|---|---|---|
| Linalool/carbohydrate | 31.5 | 31.5 | 31.7 | 33.4 | 34.9 |
| Suitable full bodied taste typical of beer-taste beverages | 2.4 | 2.4 | 2.5 | 2.7 | 2.9 |
| Suitable refreshing aftertaste typical of beer-taste beverages | 2.4 | 2.4 | 2.4 | 2.4 | 1.9 |
| Sweet aroma unsuitable for beer-taste beverages | 2.7 | 2.7 | 2.6 | 2.5 | 2.2 |
| Overall evaluation | A | A | A | A | C |

TABLE 11

| | Unit | Example 60 | Example 61 | Example 62 | Comparative Example 16 | Example 63 | Example 64 | Example 65 | Comparative Example 17 |
|---|---|---|---|---|---|---|---|---|---|
| Malt ratio | mass % | 100 | 100 | 100 | 100 | 100 | 100 | 100 | 100 |
| Real extract | mass % | 1.38 | 1.38 | 1.38 | 1.38 | 2.13 | 2.13 | 2.13 | 2.13 |
| Carbohydrate | g/100 mL | 0.4 | 0.4 | 0.4 | 0.4 | 1.3 | 1.3 | 1.3 | 1.3 |
| Linalool | ppb by mass | 15.4 | 30.3 | 78.4 | 123.5 | 12.1 | 39.7 | 82.1 | 117.5 |
| Pyroglutamic acid | mg/L | 190 | 190 | 190 | 190 | 193 | 193 | 193 | 193 |
| Pyroglutamic acid/linalool | | 12.3 | 6.3 | 2.4 | 1.5 | 16.0 | 4.9 | 2.4 | 1.6 |
| Pyroglutamic acid/carbohydrate | | 431.8 | 431.8 | 431.8 | 431.8 | 152.0 | 152.0 | 152.0 | 152.0 |
| Linalool/carbohydrate | | 35.0 | 68.9 | 178.2 | 280.7 | 9.5 | 31.3 | 64.6 | 92.5 |
| Suitable full bodied taste typical of beer-taste beverages | | 2.3 | 2.3 | 2.3 | 2.3 | 2.4 | 2.4 | 2.4 | 2.4 |
| Suitable refreshing aftertaste typical of beer-taste beverages | | 2.1 | 2.3 | 2.7 | 3.0 | 2.1 | 2.4 | 2.6 | 2.9 |
| Sweet aroma unsuitable for beer-taste beverages | | 2.9 | 2.7 | 2.4 | 1.9 | 3.0 | 2.8 | 2.5 | 1.9 |
| Overall evaluation | | B | A | A | C | B | A | A | C |

From the results of Examples, when the real extract value of the beer-taste beverage was 2.30 mass % or less, the content of pyroglutamic acid was 15 mg/L or more, and the content of linalool was from 5 to 100 ppb by mass, it was possible to provide a beverage having suppressed "sweet aroma unsuitable for beer-taste beverages" while having "suitable full bodied taste typical of beer-taste beverages" and "suitable refreshing aftertaste typical of beer-taste beverages".

The invention claimed is:

1. A beer-taste beverage having:

a real extract value of 2.30 mass % or less;

a content of pyroglutamic acid of 15 mg/L or more; and a content of linalool of from 10 to 100 ppb by mass.

2. The beer-taste beverage according to claim 1, wherein the real extract value is 0.55 mass % or more.

3. The beer-taste beverage according to claim 1, wherein the real extract value is less than 1.50 mass %.

4. The beer-taste beverage according to claim 1, wherein a content of dietary fiber is less than 0.5 g/100 mL.

5. The beer-taste beverage according to claim 1, wherein a malt ratio is 50 mass % or more.

6. The beer-taste beverage according to claim 1, wherein a malt ratio is 90 mass % or less.

7. The beer-taste beverage according to claim 1, wherein a malt ratio is 90 mass % or more.

8. The beer-taste beverage according to claim 1, wherein a malt ratio is less than 67 mass %.

9. The beer-taste beverage according to claim 1, wherein a carbohydrate content is 2.0 g/100 mL or less.

10. The beer-taste beverage according to claim 1, wherein the carbohydrate content is less than 1.0 g/100 mL.

11. The beer-taste beverage according to claim 1, wherein a ratio [(X)/(Y)] of the content of the pyroglutamic acid (X) (unit: mg/L) to the content of the linalool (Y) (unit: ppb by mass) is from 0.5 to 32.

12. The beer-taste beverage according to claim 1, wherein a ratio [(X)/(Y)] of the content of the pyroglutamic acid (X) (unit: mg/L) to the content of the linalool (Y) (unit: ppb by mass) is from 0.5 to 15.

13. The beer-taste beverage according to claim 1, wherein a ratio [(X)/(Z)] of the content of the pyroglutamic acid (X) (unit: mg/L) to carbohydrate content (Z) (unit: g/100 mL) is from 30 to 450.

14. The beer-taste beverage according to claim 1, wherein a ratio [(X)/(Z)] of the content of the pyroglutamic acid (X) (unit: mg/L) to a carbohydrate content (Z) (unit: g/100 mL) is from 30 to 300.

15. The beer-taste beverage according to claim 1, wherein a ratio [(Y)/(Z)] of the content of the linalool (Y) (unit: ppb by mass) to a carbohydrate content (Z) (unit: g/100 mL) is from 5 to 200.

16. The beer-taste beverage according to claim 1, wherein the beer-taste beverage is a top-fermented beer-taste beverage.

17. The beer-taste beverage according to claim 1, wherein the beer-taste beverage is a bottom-fermented beer-taste beverage.

18. The beer-taste beverage according to claim 1, wherein the beer-taste beverage is beer.

19. The beer-taste beverage according to claim 1, wherein a total polyphenol amount is from 20 to 250 ppm by mass, and a total nitrogen amount is from 5 to 100 mg/100 mL.

20. The beer-taste beverage according to claim 1, wherein the content of linalool is from 15 to 100 ppb by mass.

21. A method for producing a beer-taste beverage, the method comprising adjusting, in a final product:

a real extract value to 2.30 mass % or less;

a content of pyroglutamic acid to 15 mg/L or more; and a content of linalool to from 10 to 100 ppb by mass.

22. The production method according to claim 21, further comprising performing fermentation using a top-fermenting yeast.

23. The production method according to claim 21, further comprising performing fermentation using a bottom-fermenting yeast.

* * * * *